US010795184B2

(12) United States Patent
Antaki et al.

(10) Patent No.: US 10,795,184 B2
(45) Date of Patent: Oct. 6, 2020

(54) APPARATUS AND METHOD FOR IMPROVING, AUGMENTING OR ENHANCING VISION

(71) Applicant: Evergaze, Inc., Richardson, TX (US)

(72) Inventors: Patrick R. Antaki, Plano, TX (US); Ronnie Dunn, McKinney, TX (US); Russell Lemburg, Richardson, TX (US)

(73) Assignee: Evergaze, Inc., Richardson, TX (US)

(*) Notice: Subject to any disclaimer, the term of this patent is extended or adjusted under 35 U.S.C. 154(b) by 0 days.

(21) Appl. No.: 16/570,430

(22) Filed: Sep. 13, 2019

(65) Prior Publication Data

US 2020/0004052 A1 Jan. 2, 2020

Related U.S. Application Data

(63) Continuation of application No. 15/119,399, filed as application No. PCT/US2015/016717 on Feb. 19, 2015, now Pat. No. 10,459,254.
(Continued)

(51) Int. Cl.
*G02C 11/00* (2006.01)
*G06F 3/01* (2006.01)
(Continued)

(52) U.S. Cl.
CPC ............... *G02C 11/10* (2013.01); *A61H 5/00* (2013.01); *G02B 27/0093* (2013.01);
(Continued)

(58) Field of Classification Search
CPC ............... G02C 11/10; G02B 27/0093; G02B 27/0172; A61H 5/00; G06F 3/012; G06F 3/013; H04N 5/2351; H04N 5/247
See application file for complete search history.

(56) References Cited

U.S. PATENT DOCUMENTS 6,560,029 B1 5/2003 Dobbie et al.
6,663,242 B1 12/2003 Davenport
(Continued)

FOREIGN PATENT DOCUMENTS

CN 102169348 A 8/2011
CN 103557859 A 2/2014
(Continued)

OTHER PUBLICATIONS

International Search Report and Written Opinion PCT/US2015/016717 [KIPO] dated Jun. 16, 2015.
(Continued)

*Primary Examiner* — Mishawn N. Hunter
(74) *Attorney, Agent, or Firm* — Daniel J. Chalker; Edwin S. Flores; Chalker Flores, LLP

(57) ABSTRACT

The present invention provides various apparatus and methods for improving, augmenting or enhancing a vision of a person that include a first camera, one or more sensors, a microdisplay, and one or more processors communicably coupled to the first camera, the one or more sensors and the microdisplay. The first camera is configured to acquire a first image of a scene facing away from an eye of the person. The microdisplay is configured to display a modified first image to the eye. In one operational mode, the one or more processors are configured to acquire the first image of the scene using the first camera, modify the first image based on one or more vision improvement parameters, and display the modified first image on the microdisplay to improve, augment or enhance the vision of the person.

33 Claims, 14 Drawing Sheets

Related U.S. Application Data

(60) Provisional application No. 61/941,777, filed on Feb. 19, 2014.

(51) Int. Cl.
*G06F 3/00* (2006.01)
*H04N 5/225* (2006.01)
*A61H 5/00* (2006.01)
*G02B 27/00* (2006.01)
*G02B 27/01* (2006.01)
*G09B 21/00* (2006.01)
*H04N 5/235* (2006.01)
*H04N 5/247* (2006.01)

(52) U.S. Cl.
CPC ......... *G02B 27/0172* (2013.01); *G06F 3/005* (2013.01); *G06F 3/012* (2013.01); *G06F 3/013* (2013.01); *G09B 21/008* (2013.01); *H04N 5/2251* (2013.01); *H04N 5/2258* (2013.01); *H04N 5/2351* (2013.01); *H04N 5/247* (2013.01); *G02B 2027/014* (2013.01); *G02B 2027/0138* (2013.01); *G02B 2027/0178* (2013.01); *G06F 2203/0381* (2013.01); *G06F 2203/04806* (2013.01)

(56) References Cited

U.S. PATENT DOCUMENTS

| | | | |
|---|---|---|---|
| 8,956,396 | B1 | 2/2015 | Friend et al. |
| 10,039,445 | B1* | 8/2018 | Torch .................. G06K 9/0061 |
| 10,331,207 | B1* | 6/2019 | Simmons ............. H04N 13/398 |
| 2010/0149488 | A1 | 6/2010 | Lo et al. |
| 2010/0177279 | A1 | 7/2010 | Hillis et al. |
| 2013/0131985 | A1 | 5/2013 | Weiland et al. |
| 2013/0329190 | A1 | 12/2013 | Lewis et al. |
| 2013/0335543 | A1 | 12/2013 | Hilkes et al. |
| 2014/0176767 | A1 | 6/2014 | Hamel et al. |
| 2014/0240217 | A1 | 8/2014 | Lorenceau |
| 2014/0285429 | A1 | 9/2014 | Simmons |

FOREIGN PATENT DOCUMENTS

| | | |
|---|---|---|
| WO | 2012006007 A2 | 1/2012 |
| WO | 2013049248 A2 | 4/2013 |

OTHER PUBLICATIONS

Extended European Search Report EP 15752353.1 dated Aug. 10, 2017.

* cited by examiner

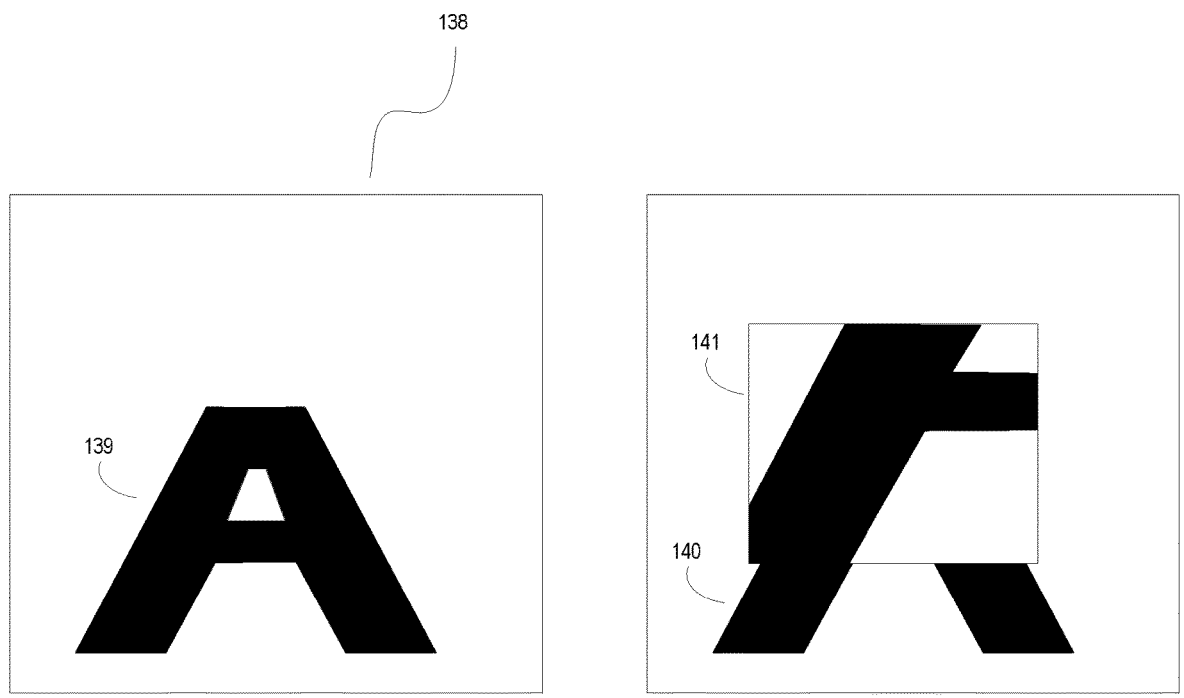
FIG. 16A
FIG. 16B
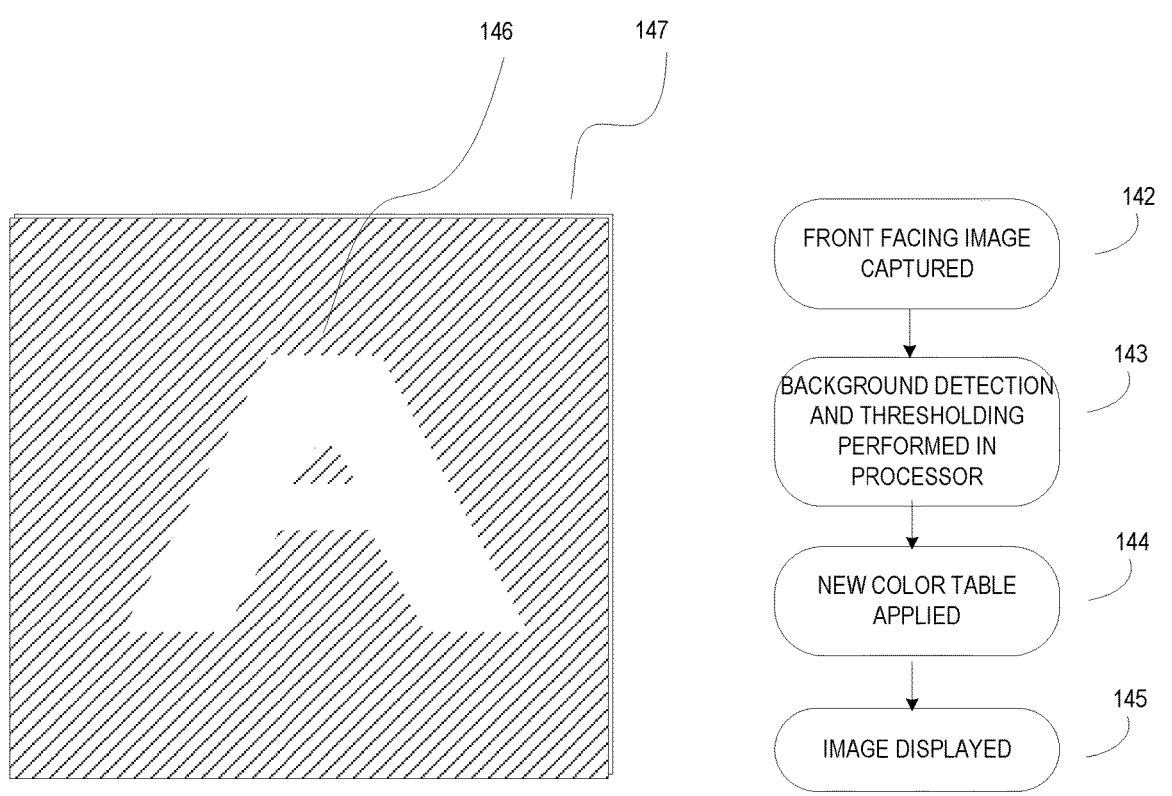
FIG. 17A
FIG. 17B

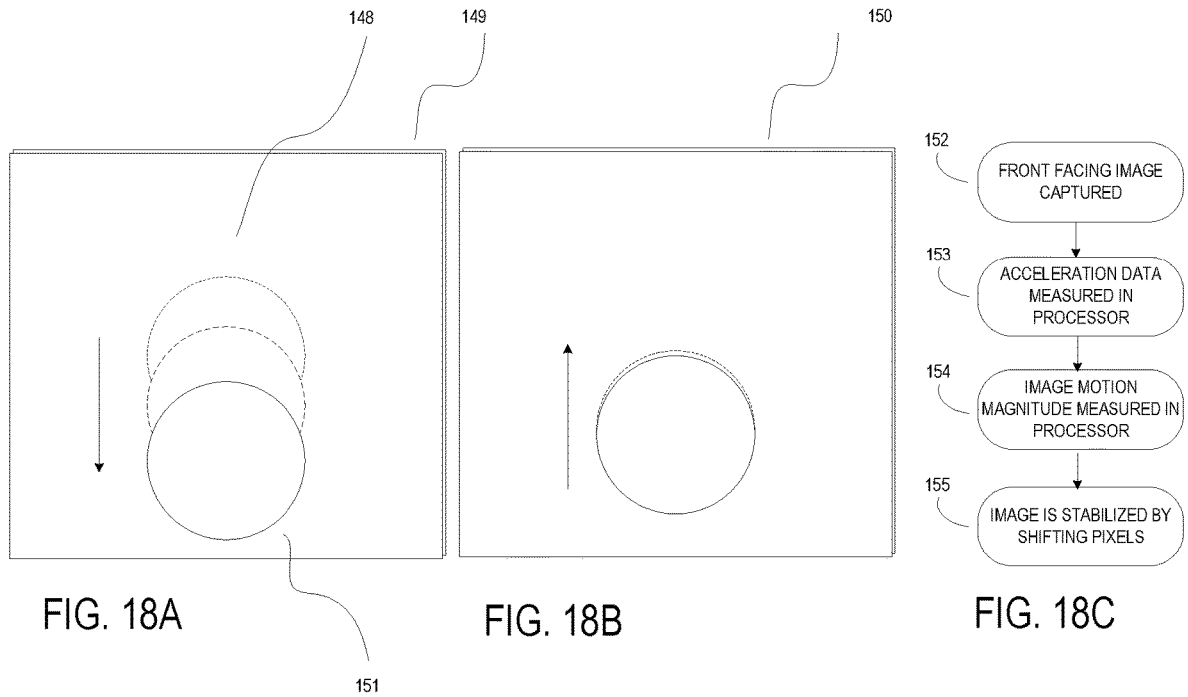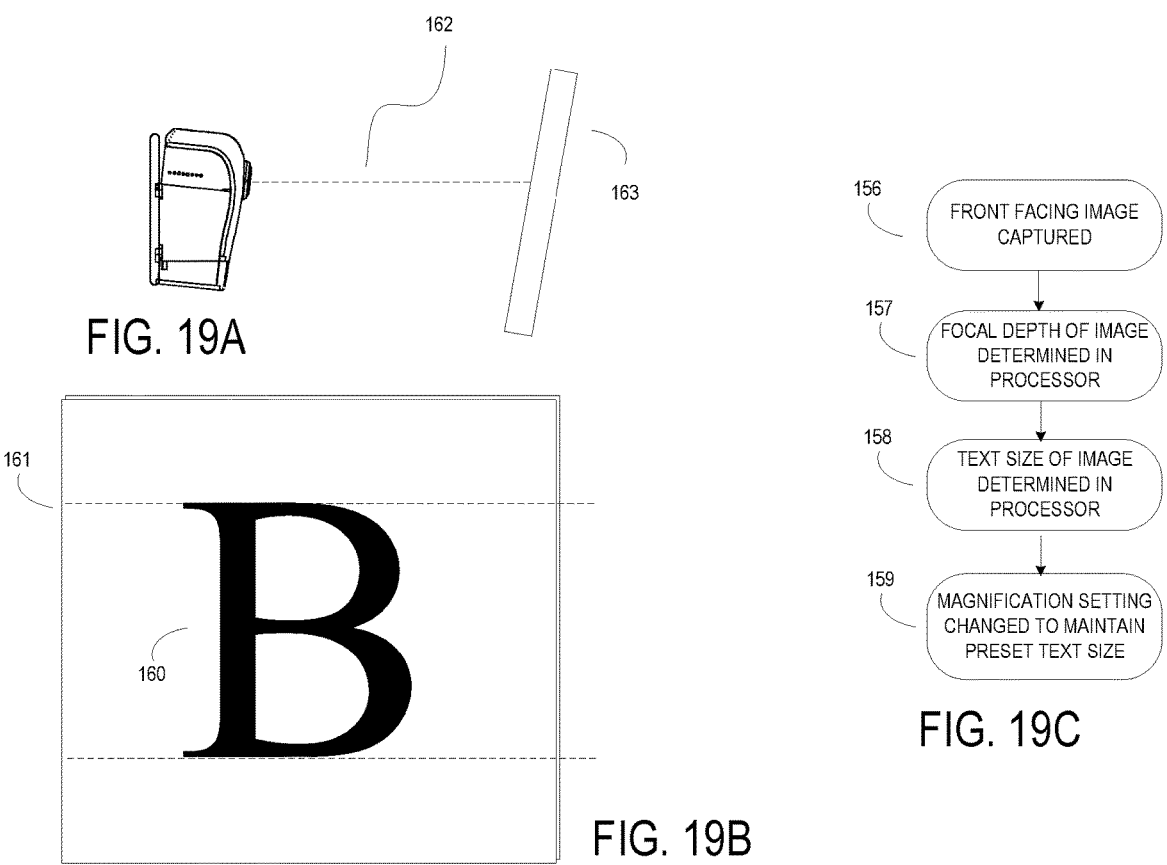

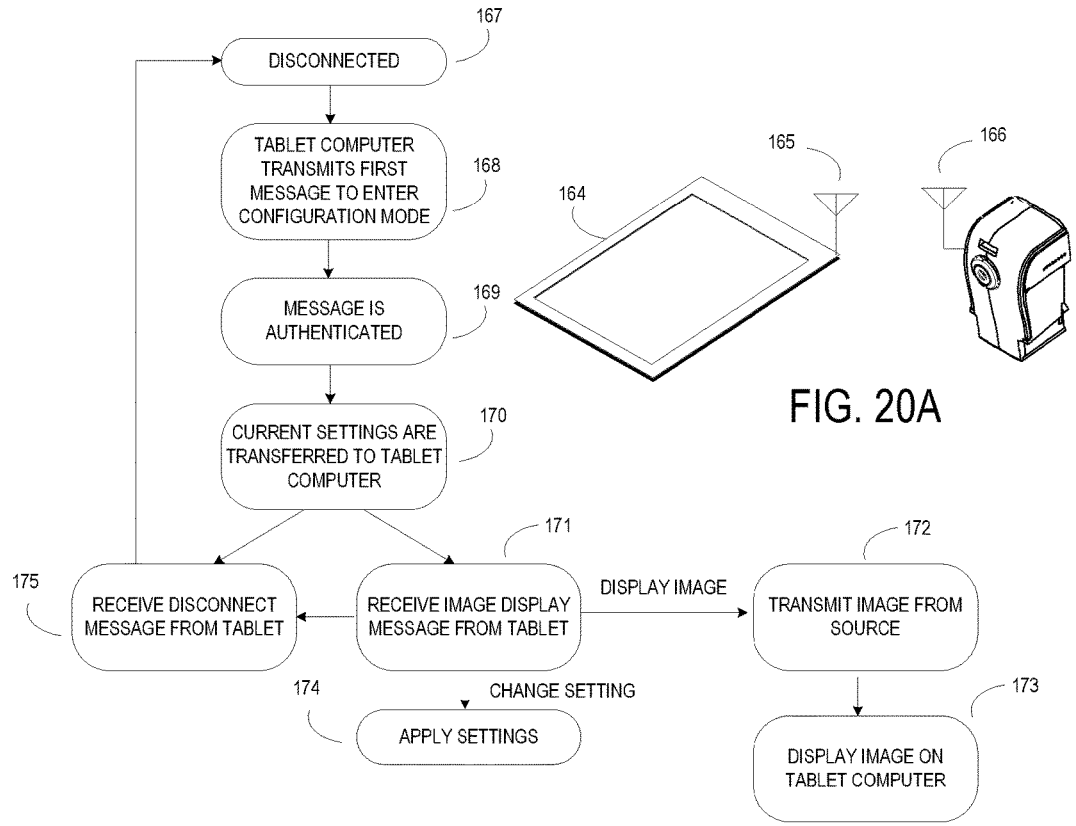
FIG. 20A
FIG. 20B
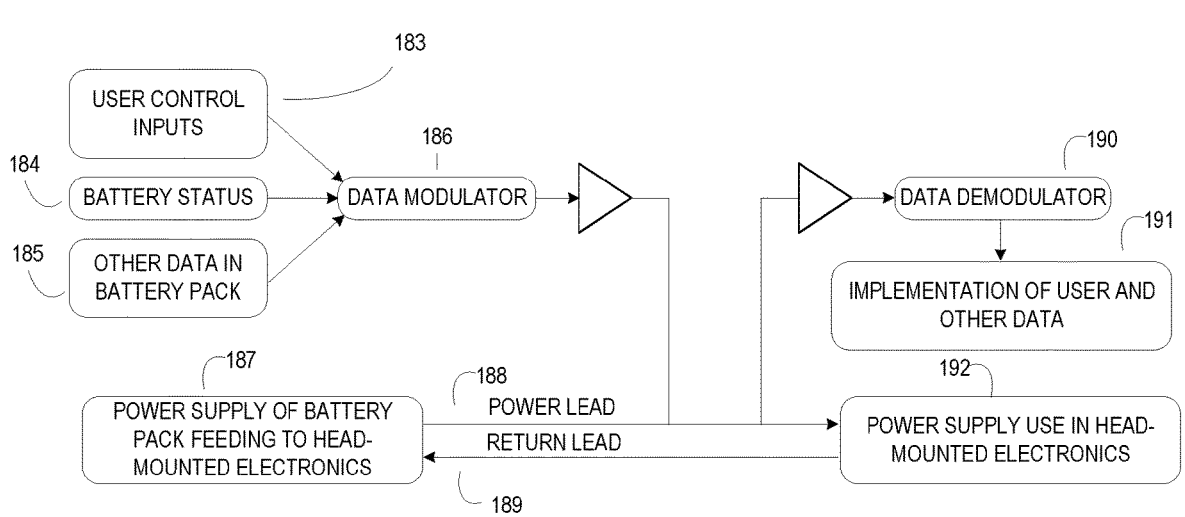
FIG. 21

APPARATUS AND METHOD FOR IMPROVING, AUGMENTING OR ENHANCING VISION

CROSS REFERENCE TO RELATED APPLICATIONS

This patent application claims priority to and is a continuation patent application of U.S. patent application Ser. No. 15/119,399, filed on Aug. 17, 2016, now U.S. Pat. No. 10,459,254 which is a National Stage of International Application No. PCT/US2015/016717, filed on Feb. 19, 2015, which claims the benefit under 35 U.S.C. § 119(e) of U.S. Provisional Application No. 61/941,777 filed Feb. 19, 2014. The foregoing applications are hereby incorporated by reference in their entirety.

FIELD OF THE INVENTION

The present invention relates generally to the field of image processing, and more specifically to a system and method for improving, augmenting or enhancing vision.

BACKGROUND OF THE INVENTION

Without limiting the scope of the invention, its background is described in connection with Age-Related Macular Degeneration (AMD). AMD is a progressive disease with a typical onset at the age of 60 years and later. It begins with a loss of central vision (typically in both eyes) and often progresses leading to effectively legal blindness. In the U.S. alone, over 1.6 million persons are afflicted with AMD, with greater than 200,000 new cases occurring yearly. Currently, there is no cure for AMD.

More specifically, AMD patients suffer from a non-correctable loss (a few angular degrees) of central vision (typically consisting of a 6 to 11 degree cone angle). This is the region of vision with the highest resolution that normal-sighted persons use for reading and discerning detail. The eye's perceptive resolution drops precipitously as the angle from the central axis increases.

AMD patients adapt to the loss of central vision by shifting to use their closest-to-center unaffected peripheral vision (e.g., "near" peripheral vision). Peripheral vision typically remains unaffected, but its resolution is significantly lower (even for normal vision persons) so that this region of vision is not useful for any detail acuity, nor can it be rendered useful with any known techniques.

Peripheral vision alone is unable to recover the visual acuity of the lost central vision (the ability to discern fine detail). The most relevant difference between central and peripheral vision of the human eye is the vastly reduced spatial resolution. In theory, an object viewed by the near peripheral vision can be made to appear with as much detail (visual acuity) as by the central vision, as long as adequate optical magnification is applied. Unfortunately, as magnification increases, the useful field of view is proportionally reduced. The resulting amount of scene information that can be perceived by this magnified region is thus also reduced. For example, low vision assistive devices' efficacy is often rated by how much these devices impact reading speed, since reading speed is highly influenced by the number of words presented within the useful visual field (inversely proportional to magnification).

Magnification has been proven to be the single most useful element to help AMD patients. While numerous magnification devices have been introduced in the marketplace, all of them have shortcomings in terms of utility within a single device to assist in a variety of everyday activities (e.g., near and far vision, bright and indoors lighting conditions, etc.) A common complaint from low vision persons is that they cannot simultaneously carry and use multiple assistive devices, each for a particular task, all the time (while remaining ambulatory, performing normal life activities hands-free).

SUMMARY OF THE INVENTION

Various embodiments of the present invention provide an apparatus and method for improving, augmenting or enhancing the vision of a person. Most often, the device will aid visually impaired persons, with AMD in particular, to better see using their existing remaining vision. The device could also be used to improve, augment or enhance the vision of a person having normal vision in various commercial, industrial, medical, military and technical applications.

Persons with AMD benefit from the digitally enhanced realtime imagery presented to the aided eye, while the unaided eye remains unobstructed. This combination allows the patient to use their undamaged peripheral vision, while augmenting their central vision. The brain automatically selects the aided or unaided eye based on the current task. The primary image enhancing software functions may include, but are not limited to, adjustable magnification, auto-focus (short and long range), contrast enhancement, artificial edge enhancement, background color substitution, anti-shake stabilization, eye-tracking and automatic image shifting. The integration of these functions into a single, ergonomic (size, shape, weight, center of gravity, etc.), hands-free, cost effective product, with the addition of certain technical features, which help prevent dizziness, headaches, binocular rivalry and other side effects typically associated with head-mounted displays, make the device practical to use all day enabling the user to undertake a variety of real-life tasks.

One embodiment of the present invention provides an apparatus for improving, augmenting or enhancing a vision of a person that includes a first camera, one or more sensors, a microdisplay, and one or more processors communicably coupled to the first camera, the one or more sensors and the microdisplay. The first camera is configured to acquire a first image of a scene facing away from an eye of the person. The microdisplay is configured to display a modified first image to the eye. In one operational mode, the one or more processors are configured to acquire the first image of the scene using the first camera, modify the first image based on one or more vision improvement parameters, and display the modified first image on the microdisplay to improve, augment or enhance the vision of the person.

Another embodiment of the present invention provides an apparatus for improving, augmenting or enhancing a vision of a person that includes a first camera, a second camera, one or more sensors, a microdisplay, and one or more processors communicably coupled to the first camera, the second camera, the one or more sensors and the microdisplay. The first camera is configured to acquire a first image of a scene facing away from an eye of the person. The second camera is configured to acquire a second image of the eye. The microdisplay is configured to display a modified first image to the eye. In operational mode, the one or more processors are configured to acquire the first image of the scene using the first camera, modify the first image based on one or more vision improvement parameters, and display the modified first image on the microdisplay to improve, augment or enhance the vision of the person. In one operational mode, the one or more processors are configured to acquire the first image of the scene using the first camera, acquire the second image of the eye using the second camera, modify the second image, determining an eye gaze angle based on the second image or the modified second image, modify the first image based on one or more vision improvement parameters by offsetting the first image based on the image offset, and display the modified first image on the microdisplay to improve, augment or enhance the vision of the person.

In yet another embodiment of the present invention, a computerized method for improving, augmenting or enhancing a vision of a person is provided. An apparatus is provided proximate to an eye of the person. The apparatus includes a first camera configured to acquire a first image of a scene facing away from the eye, one or more sensors, a microdisplay configured to display a modified first image to the eye, and one or more processors communicably coupled to the first camera, the one or more sensors and the microdisplay. The first image of the scene is acquired using the first camera and the first image is modified based on one or more vision improvement parameters using the one or more processors. The modified first image is then displayed on the microdisplay to improve, augment or enhance the vision of the person.

In addition, another embodiment of the present invention provides a computerized method for improving, augmenting or enhancing a vision of a person. An apparatus is provided proximate to an eye of the person. The apparatus includes a first camera configured to acquire a first image of a scene facing away from the eye, a second camera configured to acquire a second image of the eye, one or more sensors, a microdisplay configured to display a modified first image to the eye, and one or more processors communicably coupled to the first camera, the second camera, the one or more sensors and the microdisplay. The first image of the scene is acquired using the first camera. The second image of the eye is acquired using the second camera and the second image is modified using the one or more processors. An eye gaze angle is determined based on the second image or the modified second image using the one or more processors. The first image is modified based on one or more vision improvement parameters by offsetting the first image based on the image offset using the one or more processors. The modified first image is then displayed on the microdisplay to improve, augment or enhance the vision of the person.

The present invention is described in detail below with reference to the accompanying drawings.

BRIEF DESCRIPTION OF THE DRAWINGS

Further benefits and advantages of the present invention will become more apparent from the following description of various embodiments that are given by way of example with reference to the accompanying drawings:

FIGS. 16A and 16B are diagrams illustrating magnification of a partial field of view in accordance with one embodiment of the present invention;

FIGS. 17A and 17B are a diagram and flowchart illustrating color substitution in accordance with one embodiment of the present invention;

FIGS. 18A and 18B are diagrams and FIG. 18C is a flowchart illustrating motion stabilization and anti-shake in accordance with one embodiment of the present invention;

FIGS. 19A and 19B are diagrams and FIG. 19C is a flowchart illustrating changing magnification based on object distance and text size in accordance with one embodiment of the present invention;

FIGS. 20A and 20B are a diagram and a flowchart illustrating wireless image and settings transmission in accordance with one embodiment of the present invention; and FIG. 21 is a high-level block diagram of the power and data transfer between the neck and head-worn apparatus in accordance with one embodiment of the present invention.

DETAILED DESCRIPTION OF THE INVENTION

Figure 1:
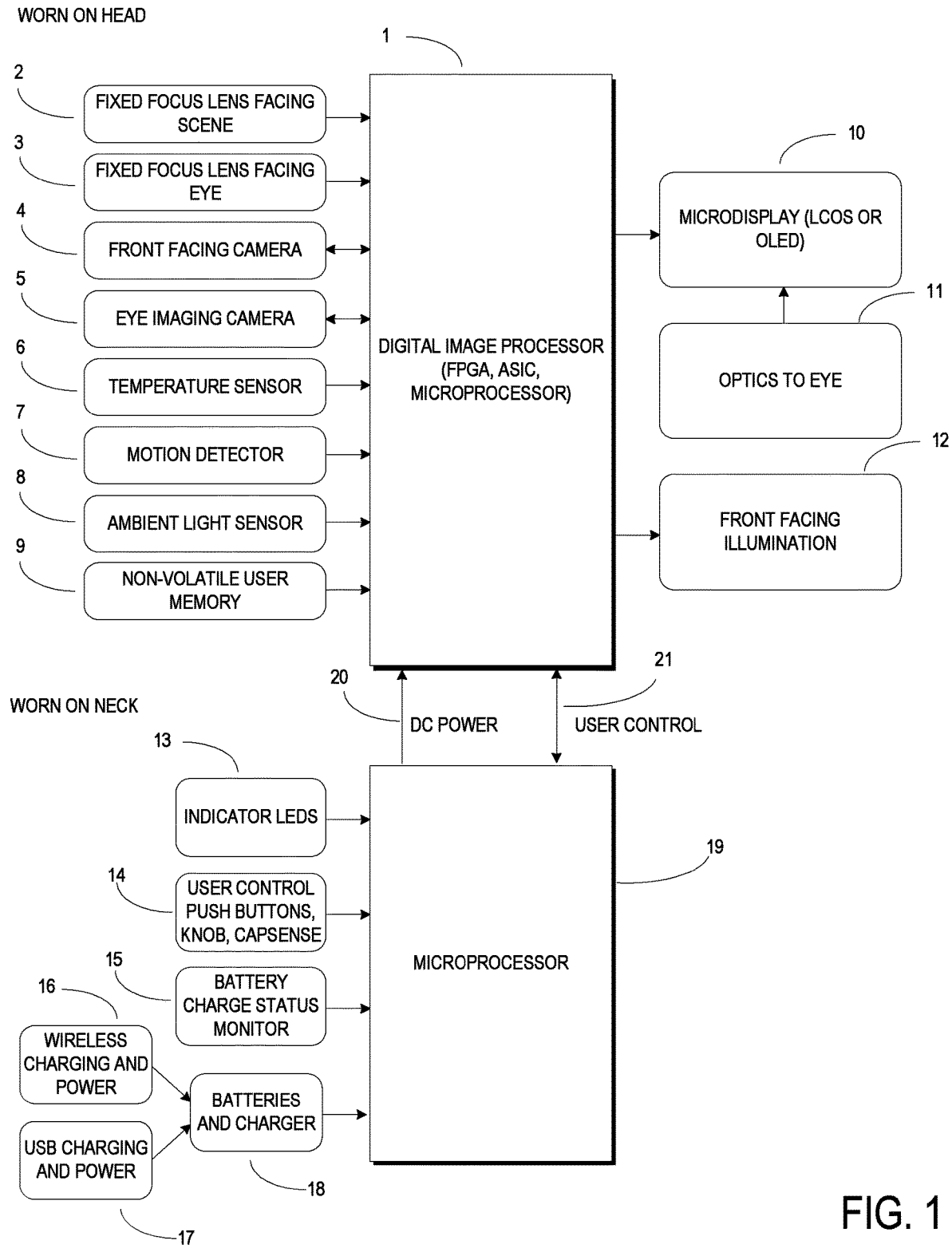
FIG. 1 is a high-level block diagram of a neck and head-worn apparatus in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Various embodiments of the present invention provide an apparatus and method for improving, augmenting or enhancing the vision of a person. Most often, the device will aid visually impaired persons, with AMD in particular, to better see using their existing remaining vision. The device could also be used to improve, augment or enhance the vision of a person having normal vision in various commercial, industrial, medical, military and technical applications.

Persons with AMD benefit from the digitally enhanced realtime imagery presented to the aided eye, while the unaided eye remains unobstructed. This combination allows the patient to use their undamaged peripheral vision, while augmenting their central vision. The brain automatically selects the aided or unaided eye based on the current task. The primary image enhancing software functions may include, but are not limited to, adjustable magnification, auto-focus (short and long range), contrast enhancement, artificial edge enhancement, background color substitution, anti-shake stabilization, eye-tracking and automatic image shifting. The integration of these functions into a single, ergonomic (size, shape, weight, center of gravity, etc.), hands-free, cost effective product, with the addition of certain technical features, which help prevent dizziness, headaches, binocular rivalry and other side effects typically associated with head-mounted displays, make the device practical to use all day enabling the user to undertake a variety of real-life tasks.

Various embodiments of the present invention provide devices and methods for improving, augmenting or enhancing the vision of persons suffering from various low vision conditions, such as Age-Related Macular Degeneration (AMD). One embodiment of the device consists of a spectacle-mounted monocular electronic camera and display system. The camera captures images of the scene in front of the person and presents these to the aided eye after digital image manipulation, which may include magnification, contrast enhancement, edge sharpening, etc. This enhances visibility with imperceptible time lag, resulting in significantly improved visual perception under varying scene conditions (indoors and outdoors, near and distance gaze). The device is preferably is small and light allowing it to be mounted on prescription (or non-prescription) glasses, sunglasses, spectacles, monocles, etc. The most common use is as a monocular (single-eye) configuration, but it can also be used in a binocular configuration.

With respect to assisting persons with AMD, the primary function of the device is to magnify the images of the scene facing the user (person wearing the device), to enhance contrast, and to artificially enhance edges (such as doorways, stairs, etc.). In order to achieve practical functionality and utility for all-day usage by the user, other functions can be included in the device, including auto-focus, auto-brightness and white balance, eye tracking (described later), anti-shake image stabilization, simple and mostly automatic device operation and controls, in addition to long battery life. Note that the primary function can be changed or altered to meet the specific vision needs of the person.

One embodiment of the present invention will now be described in more detail in reference to FIGS. 1-21. The present invention is not limited to this embodiment as it is provided for illustrative purposes only.

FIG. 1 is a high-level block diagram describing components of the electronic device worn on the head or glasses, referred to as the Head Mounted Display Unit (hereinafter, HMDU) and the neck worn battery pack (hereinafter, the battery pack). The HMDU includes a variable focus lens facing the scene in front of the person wearing the HMDU (hereinafter, the user) (2), a fixed focus lens facing the eye of the wearer (3), a front facing camera (hereinafter, the front camera) which captures images of the scene in front of the wearer (hereinafter, the scene) (4), an eye imaging camera which captures images of the user's eye (5) (hereinafter, Eye Tracking camera, or ET camera), a temperature sensor (6), a motion detector (7) comprising one or more sensors (such a 3-axis solid-state accelerometer integrated circuit) which detects the user's motion of the head or body, an ambient light sensor (8) which detects the ambient light in the scene, and non-volatile user memory (9) where all user configurations, statistics, and preferences are stored. These components are all interfaced to a digital image processor or processors (1), such as one or more, or a combination of microprocessors, Field-Programmable Gate Arrays (FPGA), Application Specific Integrated Circuits (ASIC) or even embedded or partially embedded within either the front camera or the microdisplay components (hereinafter, the processor). The outputs of this processor are configured to send image data to a microdisplay (10). The microdisplay contains optics (11) enabling the eye to see the image emanating from the microdisplay. The front camera and display illumination (12) is controlled by the processor and illuminates the scene as well as the image presented to the eye through the microdisplay.

The front camera and the ET camera face the scene and the user's eye, respectively, by one of several means or combinations of means. The simplest form of a camera to face its target is to be mounted mechanically in a plane that is directly orthogonal to the scene, and that the optical path from the scene to the camera also be parallel, orthogonal and coincident with the scene. It is possible to achieve such a final alignment of the camera to its target through other means, such as the use of mirrors, or electronic offsets to compensate for left-right or up-down (or even angular) misalignments, or desired image shifts.

The battery pack includes indicator LEDs (13), user controls (14) (push buttons, a knob, a Cypress Semiconductor capsense electronic slider or buttons), battery charge status monitoring (15), wireless battery charging and power (16), USB or DC power charging and power (17), and a battery (typically rechargeable, but can also be a primary non-rechargeable type) and battery charge circuitry (18). A microprocessor (19) coordinates all the elements of the battery pack and its communications to/from the HMDU. Although the current preferred embodiment is to mount the battery pack around the neck using a stylish lanyard, the battery pack may be located in other places generally on the user's person, including behind the neck, in a pocket within clothes, on the back of the glasses frames, on the belt, or other such places.

DC power cables (20) deliver electrical energy from the battery pack to the HMDU, and user control conductors (21) transmit the user control commands to the HMDU. In some embodiments, user controls may be located directly on the HMDU rather than in the battery pack.

Figure 2:
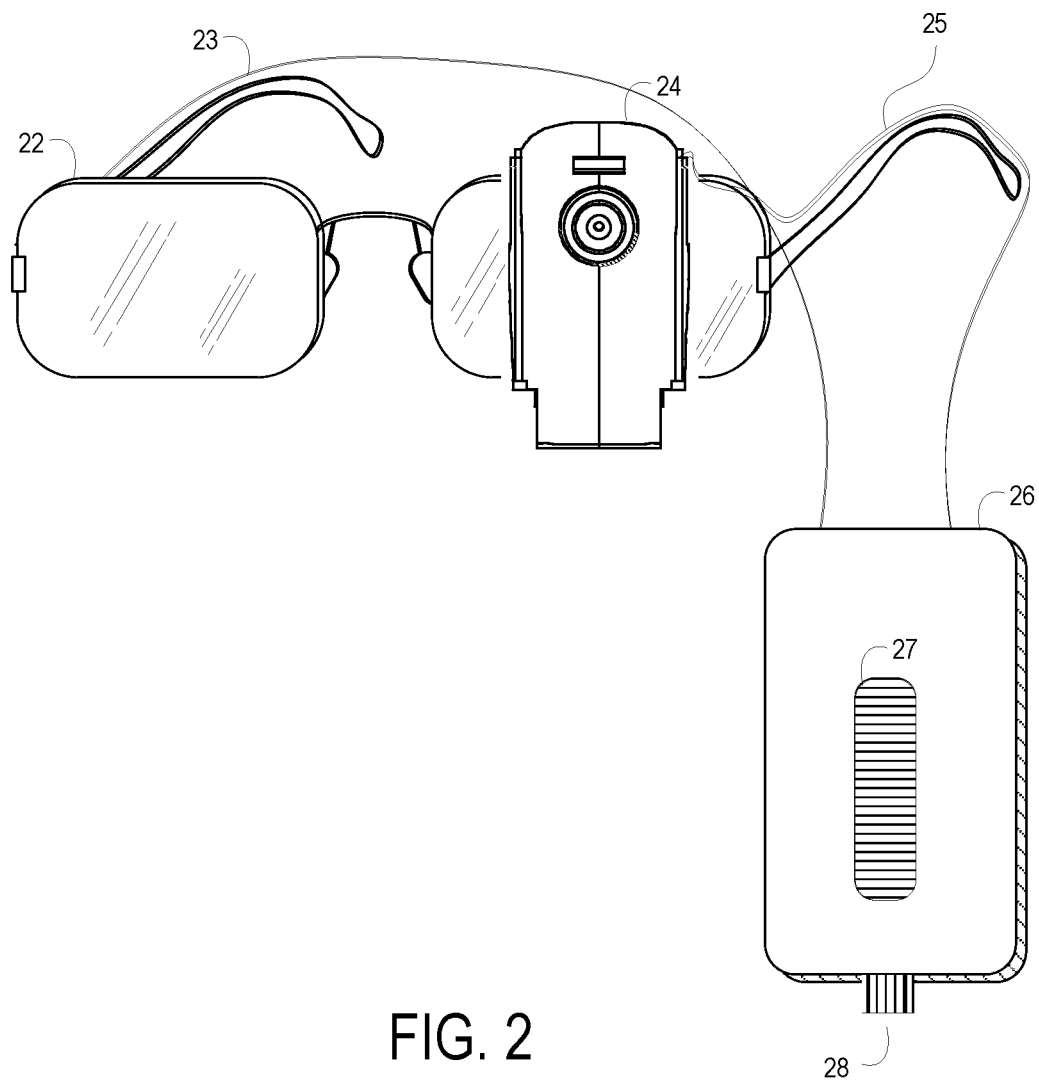
FIG. 2 is a diagram of a head and neck worn apparatus mounted on eyeglasses in accordance with one embodiment of the present invention.

FIG. 2 shows a graphical representation of the HMDU (24) including attachment to one lens of the eyeglasses (22) and eyeglass frames (25), and the battery pack (26). The cable (23) connecting the battery pack to the HMDU transmits user input control data, battery status data and other data stored in the electronics worn on the neck. The battery pack contains user controls, including a capsense slider (27) or other controls such as a knob (28). Other controls on either unit may include buttons, voice activated control, eye motion activated control, focus control, gesture recognition control, automatic sleep/wake-up control, or a combination thereof. The controls can be remotely located with respect to the one or more processors and other components, and may communicate via conductors or wirelessly. It should be noted that the HMDU does not occlude, or obscure, the peripheral vision (both to the sides or to the top or bottom) of the user's eye where the HMDU is mounted, nor does this device in the monocular (where a single HMDU used) interfere at all with the user's eye where no HMDU is mounted. For certain persons afflicted with vision loss such as Age-Related Macular Degeneration (AMD) the ability to derive benefit from the HMDU vision enhancements in the central portion of the user's vision while simultaneously not losing peripheral vision (in both the aided eye, where the HMDU is mounted) as well as in the unaided eye (the eye without an HMDU), is critical in enabling the beneficial use of the HMDU in all normal-life tasks.

Figure 3:
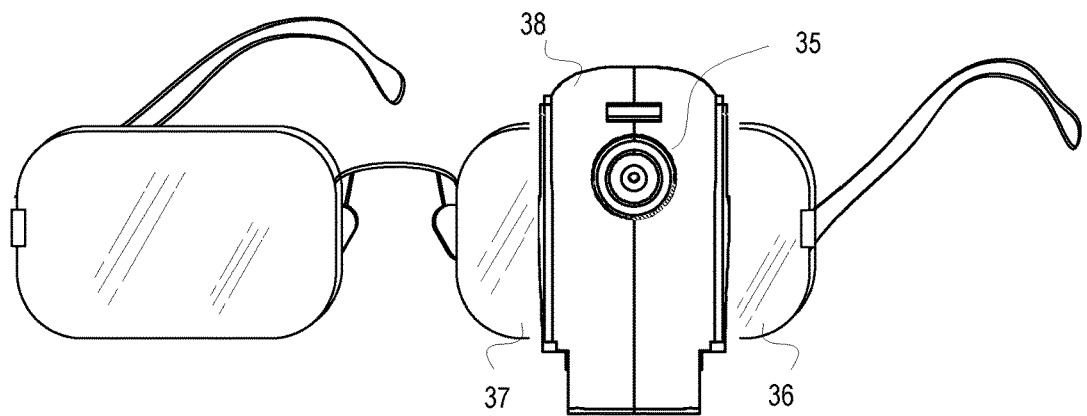
FIG. 3 is a front view of the head-worn apparatus mounted on eyeglasses in accordance with one embodiment of the present invention.

FIG. 3 is a front view of the HMDU (38) in FIG. 2 mounted on spectacles, showing the front facing camera (35) and unobscured space to the left and right of the eye left (35) from the shape of the HMDU (36 and 37). The current embodiment provides for a 30 degree horizontal field of view whereby the user's vision is enhanced by looking at the HMDU display, while the remaining eye's field of view remains unimpeded. The HMDU can be attached to or integrated into a monocle, pair of glasses, pair of sunglasses, a frame or other wearable apparel to support the device. The HMDU is typically sized to maintain a peripheral vision of the person, and is mounted or positioned in front of the eye or a pupil of the eye such that a second eye of the person is unobstructed.

Figure 4:
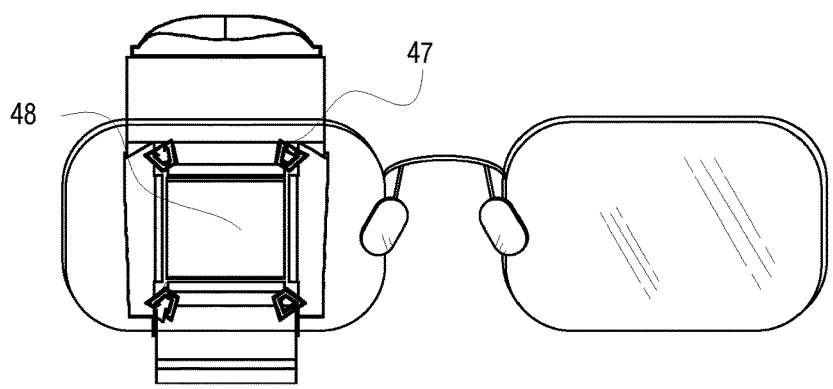
FIG. 4 is a back view of the head-worn apparatus mounted on eyeglasses in accordance with one embodiment of the present invention.

FIG. 4 is a back view (from the user's side) of the HMDU in FIG. 2 mounted on spectacles, showing the eye-box (48) where a processed image is presented to the eye, and mounting legs (47) where the head-mounted device can be cemented to spectacles. The preferred mounting location of the HMDU is on the outside surface of the spectacles' lens, and centered onto the user's pupil. Certain users have eccentric viewing, whereby the center of their pupil is not centered facing directly forwarded. In these cases, the HMDU may be mounted directly in front of the non-forward pointing pupil, or an electronic image offset may be programmed into the HMDU to perform such an image offset to compensate for that user's gaze eccentricity. Note that the alignment to the pupil is in both axes (up/down as well as left/right).

Figure 5:
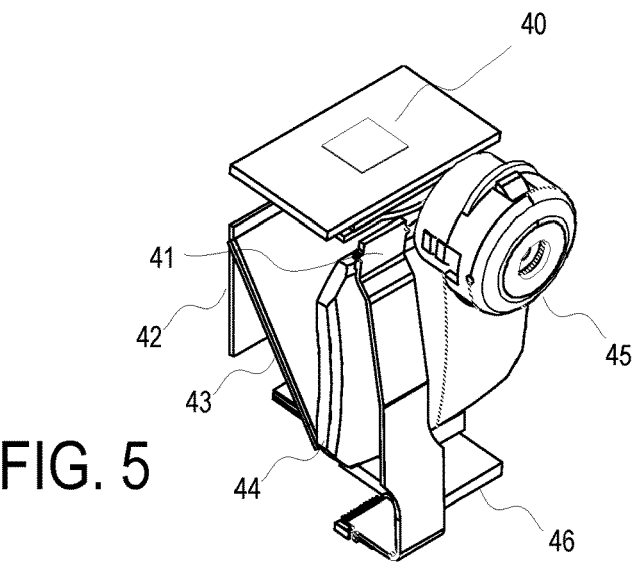
FIG. 5 is a perspective view of the internal electronics within the head-worn in accordance with one embodiment of the present invention.

FIG. 5 is a view of the internal electronics and optics of the HMDU in FIG. 2, containing the necessary elements for the front camera and variable focus lens (45) which adjusts for focus based on the HMDU's distance to the scene of interest, the processor and sensors (40), interconnect between eye imaging camera and one or more processors (41), optical assembly facing the eye (42, 43, 44), and eye imaging camera (46). In this embodiment, a backwards facing mirror (44) relays and magnifies the image emanating from the microdisplay towards the user's eye. By design, the focus distance for the eye is set to long distance, which represents the most relaxed position of the rectus muscles inside the human eye.

Figure 6:
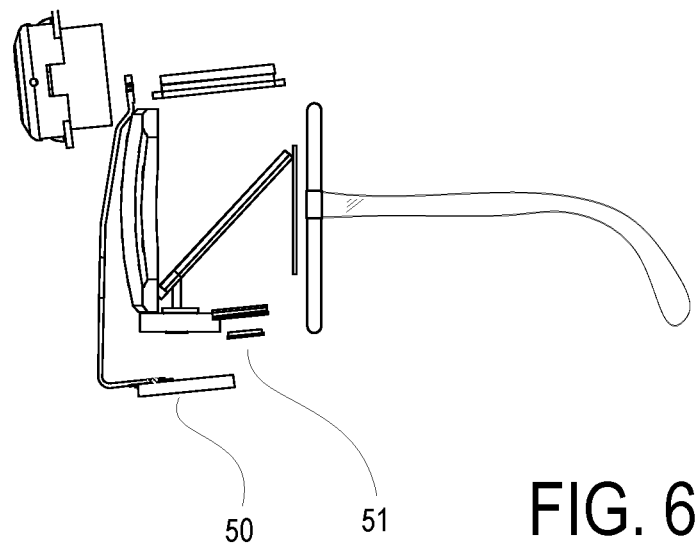
FIG. 6 is a side view of the internal electronics within the head-worn in accordance with one embodiment of the present invention.

FIG. 6 is a side view of the internal electronics of the head-worn electronic device, showing display illumination (51). The display illumination uses white LEDs which can be driven to varying levels of power, and controlled by the processor. The level of drive of these LEDs is influenced by a number of factors, including ambient light of the scene, the sensitivity of the user's eye, and other function-specific settings of the HMDU. Eye imaging illumination (50) consists of one or more infrared LEDs which illuminate the eye to allow the ET camera (also 50) to adequately image the user's eye. Use of infrared illumination into the eye is not objectionable as this light waveband is not perceived by the human eye. The visible or infrared illuminator can activated or deactivated based on a light level, a distance determination, a switch or a control communicably coupled to the visible or infrared illuminator.

Figure 7:
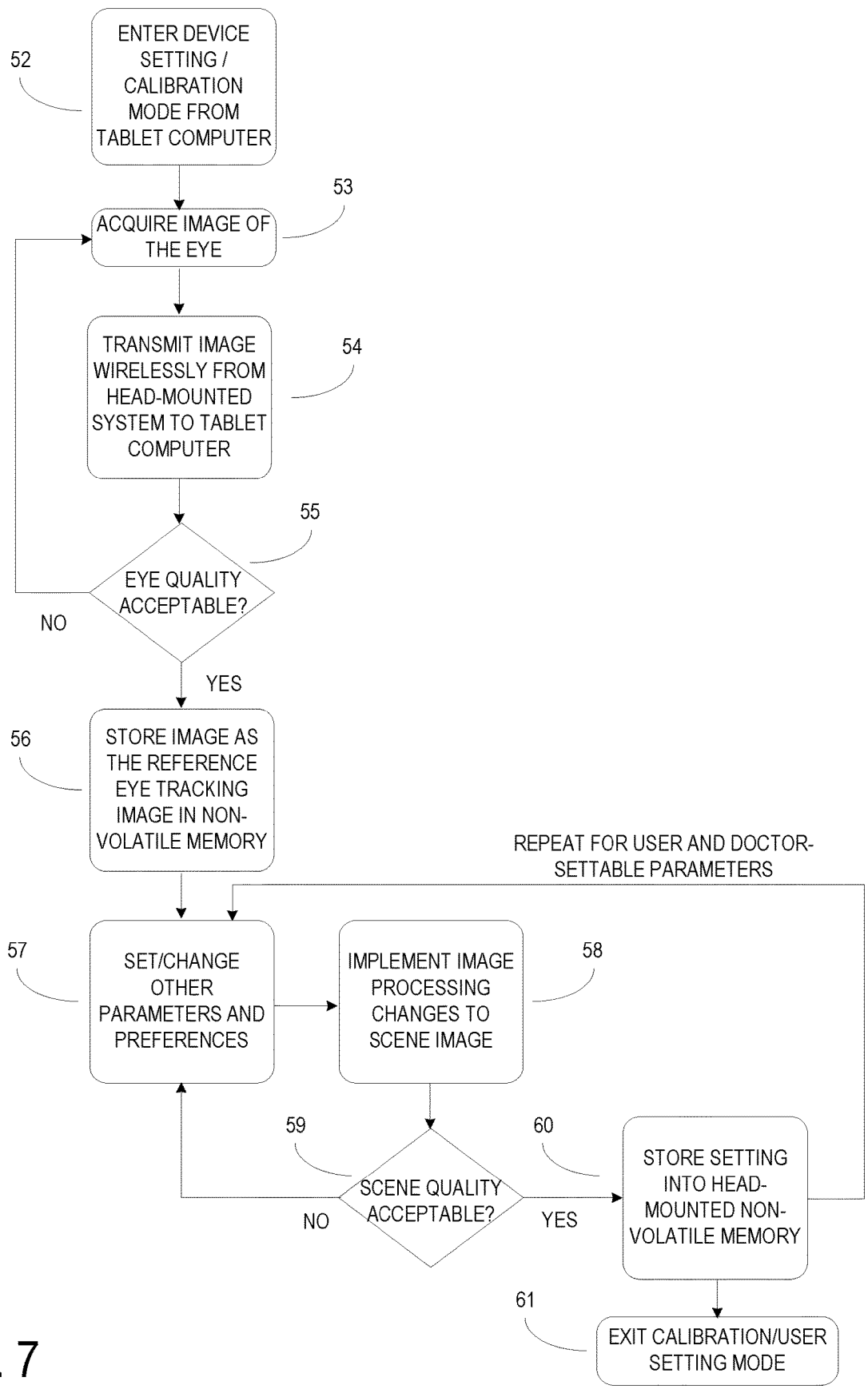
FIG. 7 is a flow chart for calibrating and configuring the settings of an apparatus in accordance with one embodiment of the present invention.

FIG. 7 is a flow chart describing the process for entering a device setting and calibration mode from a wireless connected table computer (52), used to acquire an image of the eye from the eye imaging camera (53), transmit the image in a wireless manner to the connected computer (54), check if eye quality is acceptable (55). If the quality is observed acceptable, the HMDU stores the image in the head-worn device as a reference image used to calibrate the eye for tracking (56). After this process is complete, the user can then set and change other parameters and preferences (57) to modify processing parameters applied to the image (58) executed on the processor or processors. If the scene quality is acceptable (59), then these settings can be stored into head-mounted memory (60), and the configuration operation can be completed (60), or the process of setting parameters can be further modified.

For example, the one or more stored settings or preferences can be configured by receiving a first message to enter a device setting/calibration mode from a remote device, transmitting the first image or the modified first image or both the first image and the modified first image to the remote device, receiving a second message containing a change to the one or more stored settings or preferences, implementing the change during one or more of the steps of acquiring the first image, modifying the first image and displaying the modified first image, transmitting the first image or the modified first image or both the first image and the modified first image to the remote device, storing the change to the one or more stored settings or preferences whenever a third message is received indicating that the first image or the modified first image or both the first image and the modified first image are acceptable, removing the change to the one or more stored settings or preferences whenever a fourth message is received indicating that the first image or the modified first image or both the first image and the modified first image are not acceptable, and receiving a fifth message to exit the device setting/calibration mode from the remote device. The steps of receiving the second message, implementing the change, transmitting the first image or the modified first image or both the first image and the modified first image, and storing or removing the change can be repeated until the configuration process is complete. Moreover, the one or more stored settings or preferences can be reset to a set of default settings or preferences.

In another example, the one or more stored settings or preferences can be configured by receiving a first message to enter a device setting/calibration mode from a remote device, transmitting the first image or the modified first image or the second image or the modified second image or a combination thereof to the remote device, storing the second image or the modified second image as the stored image of the eye whenever a sixth message is received indicating that the second image is acceptable, repeating the steps of acquiring and transmitting the first image or the modified first image or the second image or the modified second image or a combination thereof whenever a seventh message is received indicating that the second image is not acceptable, and receiving a fifth message to exit the device setting/calibration mode from the remote device.

Figure 8:
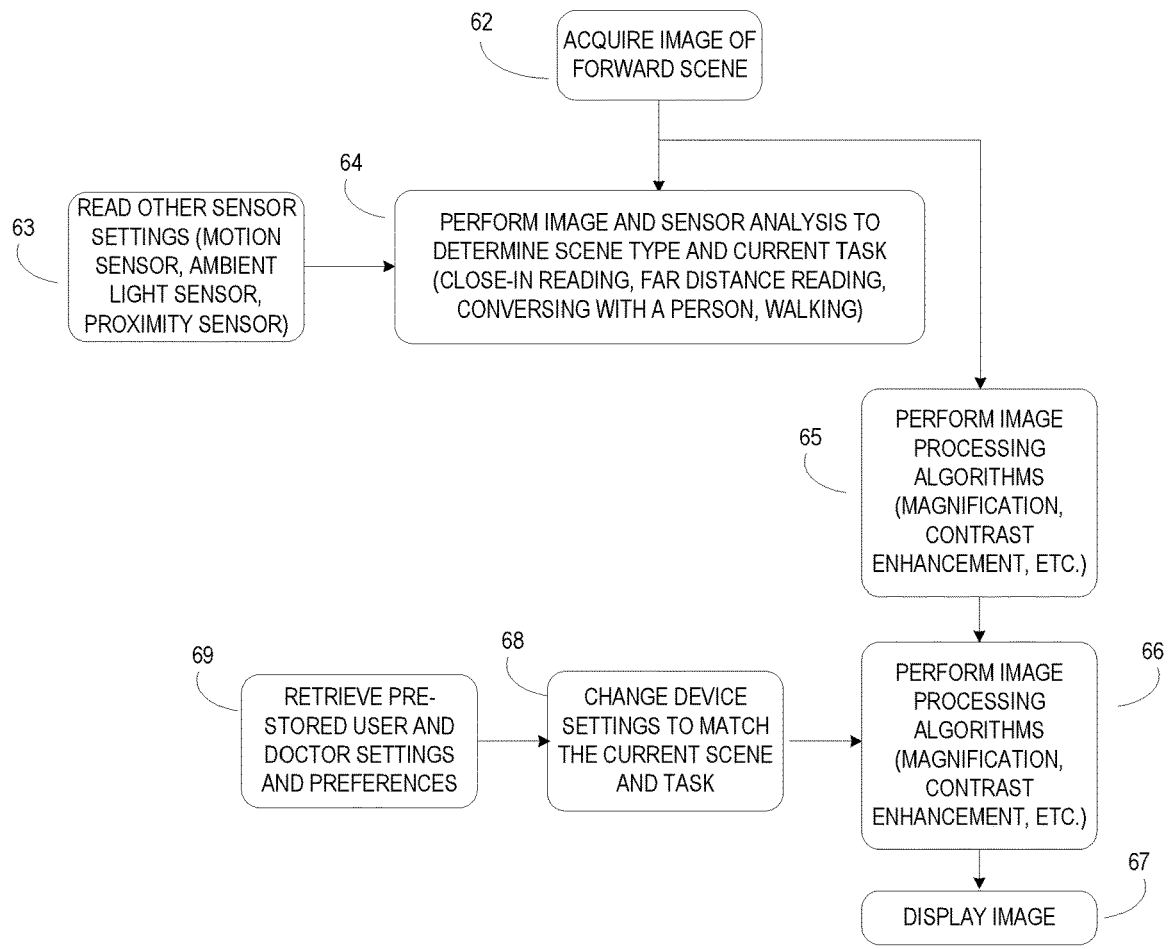
FIG. 8 is a flow chart for processing images in accordance with one embodiment of the present invention.

FIG. 8 is a process diagram describing the technique for determining the types of image processing algorithms which will be executed on the processor or processors, determined by reading sensor information and determining the type of scene. The scene is acquired (63) and other sensor settings are read such as light, proximity and motion (63) to determine the type of task being performed based on this scene activity (64). Image processing algorithms are performed (66) based on this scene determination, in combination with pre-stored settings and preferences (69) which were set for the current task (69). The current task may include a close-in reading, a far distance reading, gazing at an external electronic display, looking at another person, walking, driving or other desired task. Finally, the modified image is displayed (67).

Figure 9:
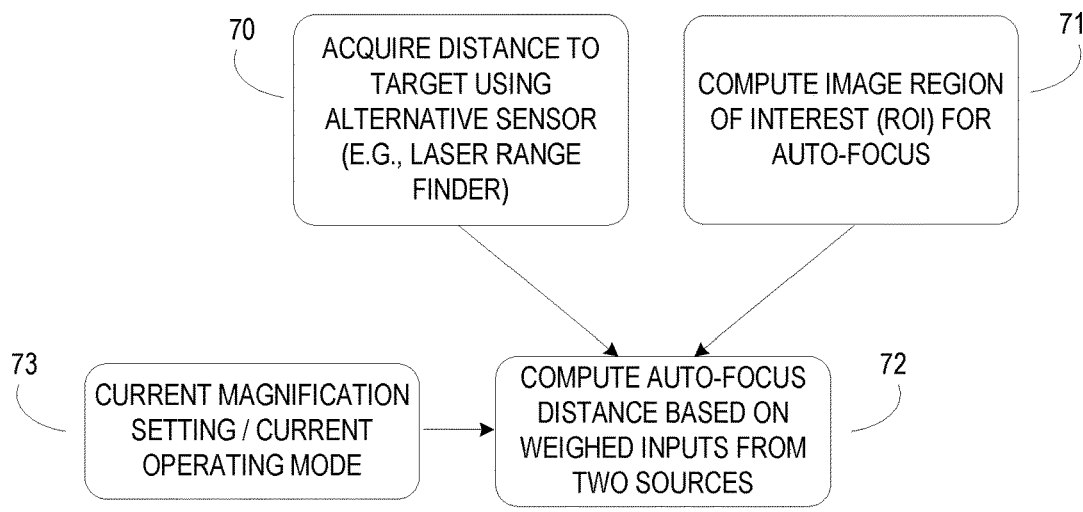
FIG. 9 is a flow chart for automatically focusing an image in accordance with one embodiment of the present invention.

FIG. 9 is a process diagram illustrating the computation of focal distance to an object using a weighed input from two sources (72). The image is acquired in combination with an alternative sensor (70) which can be used to roughly determine the focal distance to an object. The image region used for auto-focus (71) can either be determined from this measurement or independently. The current magnification setting and operating mode (73) also determine the computed focus distance.

Figure 10:
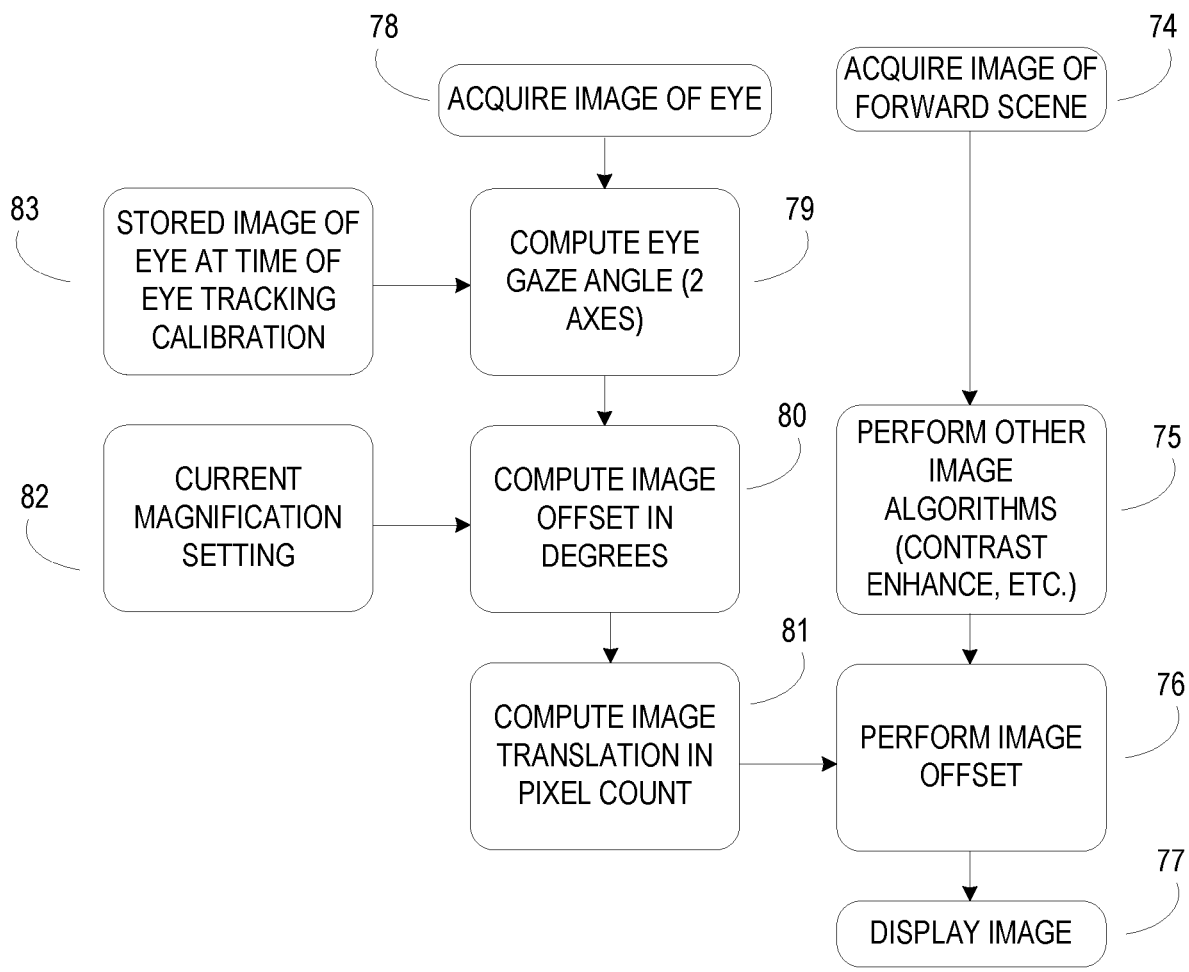
FIG. 10 is a flow chart for determining an eye gaze angle image offset in accordance with one embodiment of the present invention.

FIG. 10 is a process diagram illustrating the use of the eye image to compute the gaze angle and translate this information to pixel count, which can then be used to offset the image displayed to the eye. An image of the eye is acquired (78) and the eye gaze angle on two axes (vertical eye gaze angle and horizontal eye gaze angle) is computed (79) by using the stored image of the eye or a preferred locus of a pupil of the eye at time of eye tracking calibration (83). Then, the image offset is computed in degrees (80) and modified based on the current magnification setting (82). The image is translated in pixel counts (81). The scene image is acquired (74) and the image is further processed with image algorithms (75). The scene image is then offset in equal and opposite distance to the computed image offset in degrees (76) and displayed to the eye (77). Note that is some embodiments, the determination of the eye gaze angle does not require any initial calibration or alignment.

Figure 11:
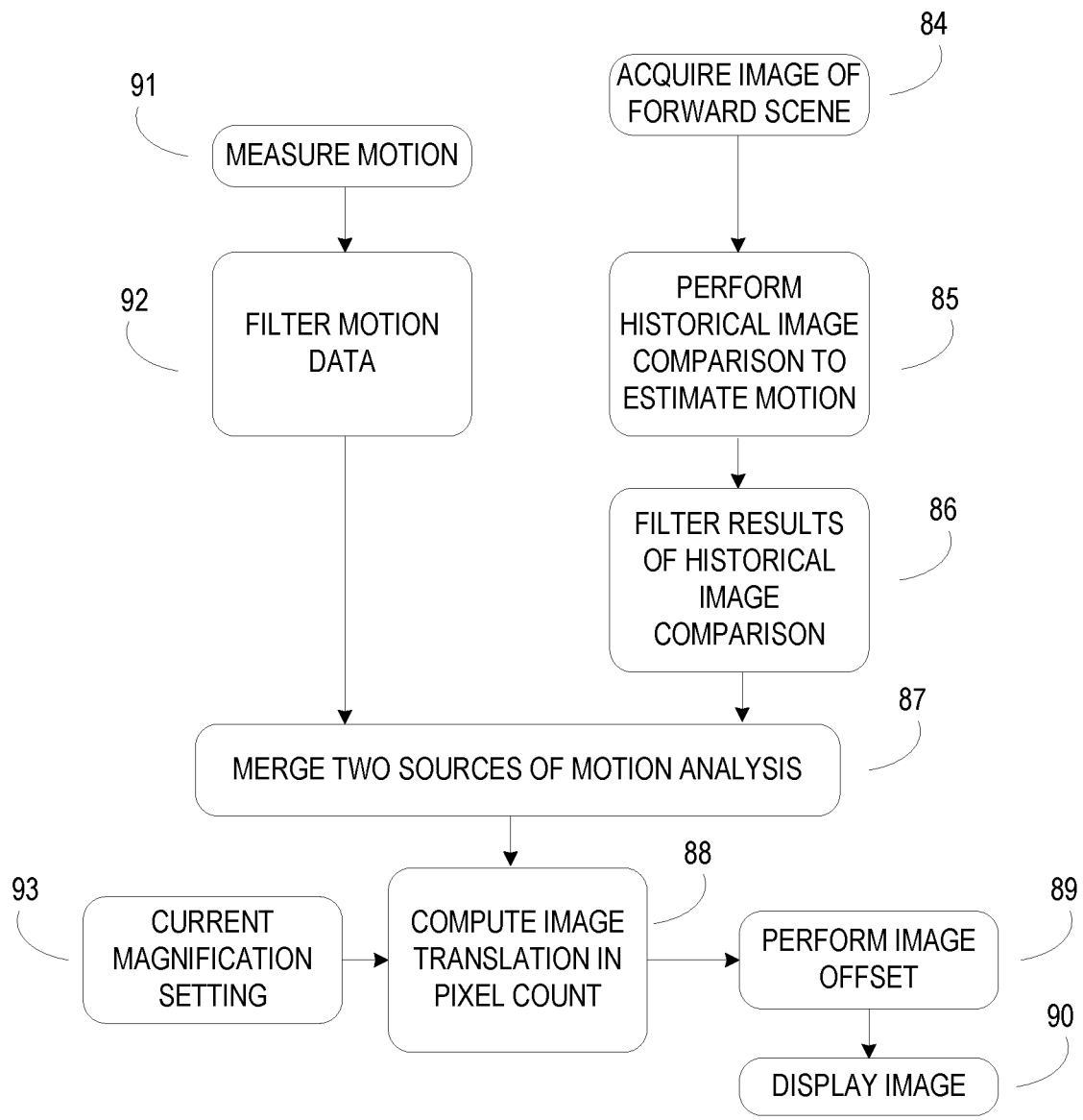
FIG. 11 is a flow chart for motion reduction in accordance with one embodiment of the present invention.

FIG. 11 is a process diagram illustrating the use of one or more motion sensors (e.g., a motion measurement sensor to measure an acceleration data) merged with statistics gathered from a front facing camera to remove excess motion from an image by performing an image offset. The scene image is acquired (84) and a historical image comparison is used (image subtraction) to estimate the image motion and direction (85) (e.g., an estimated motion data). The results of the historical image motion computation are filtered (86). Motion is measured from one or more motion sensors (91) and the motion data is filtered (92). Both the filtered motion data (e.g., filtered acceleration data) and filtered historical image data (e.g., filtered estimated motion data) are merged (87) and the processor or processors compute an image translation amount in pixels (88), which is further modified by the current magnification setting (93) and then used to offset the image (89) and present it to the eye (90).

Figure 12:
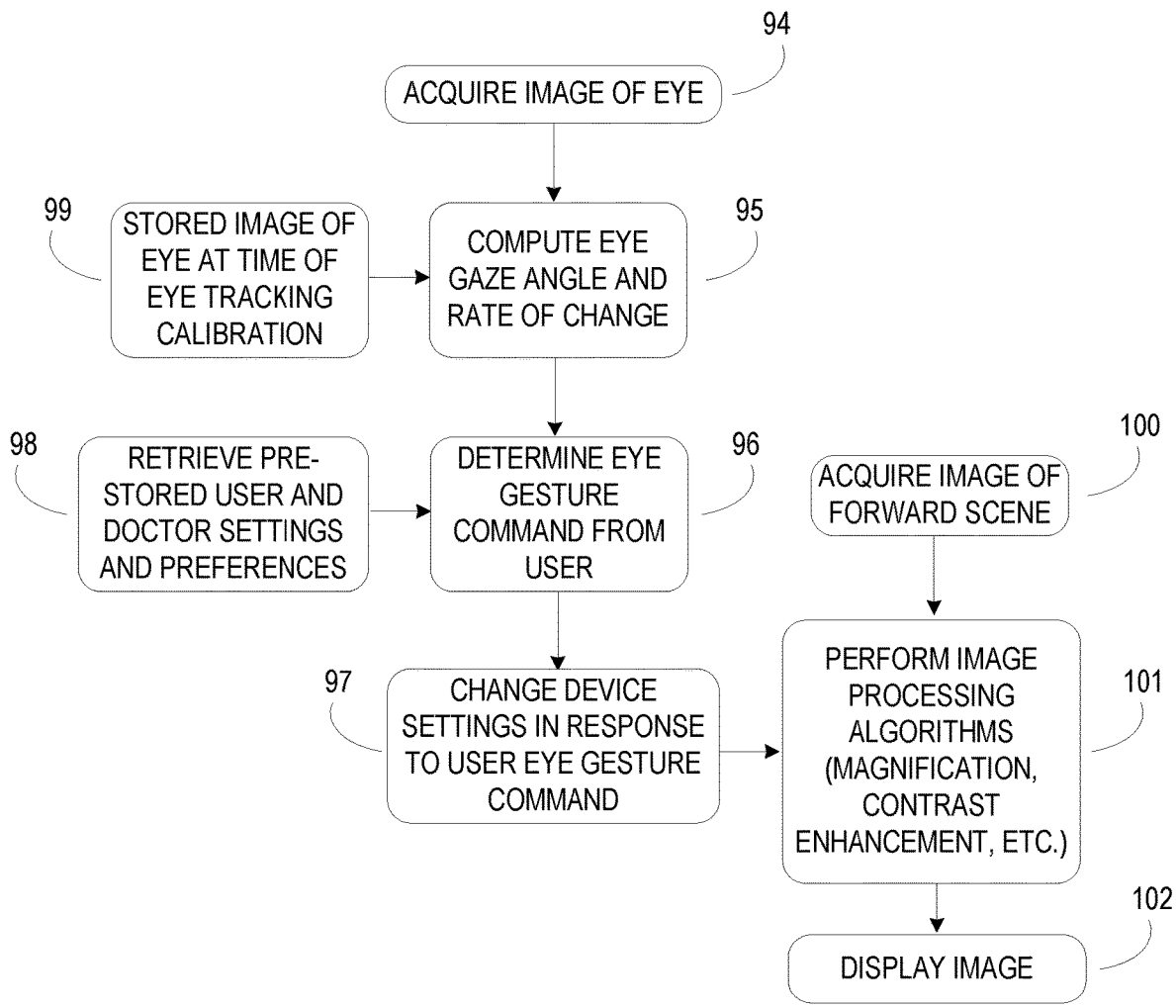
FIG. 12 is a flow chart for eye gaze angle gesture recognition in accordance with one embodiment of the present invention.

FIG. 12 is a process diagram illustrating the use of the eye image to compute the gaze angle and rate of motion to detect a gestured command and use this command to change device settings in response to such command. An image of the eye is acquired (94) and the gaze angle and rate of change of the angle is computed (95) based on a stored image of the eye at time of eye tracking calibration (99). This information is used to determine eye gestures, which can are interpreted as user commands (96) by pre-stored settings and preferences (98). The current device settings can then be further modified (97) by responding to the eye gesture command. The scene is captured (100) and image processing algorithms are performed based on the new user settings and preferences (101) and the image is presented to the eye (102). The image processing algorithms may include a contrast enhancement algorithm, an edge sharpening algorithm, a virtual real-time aided vision algorithm, an automatic scene detection and mode setting algorithm, a magnification or image offset algorithm, an artificial edge highlighting/substitution algorithm, a gaze determination algorithm, or any other desired algorithm.

Figure 13:
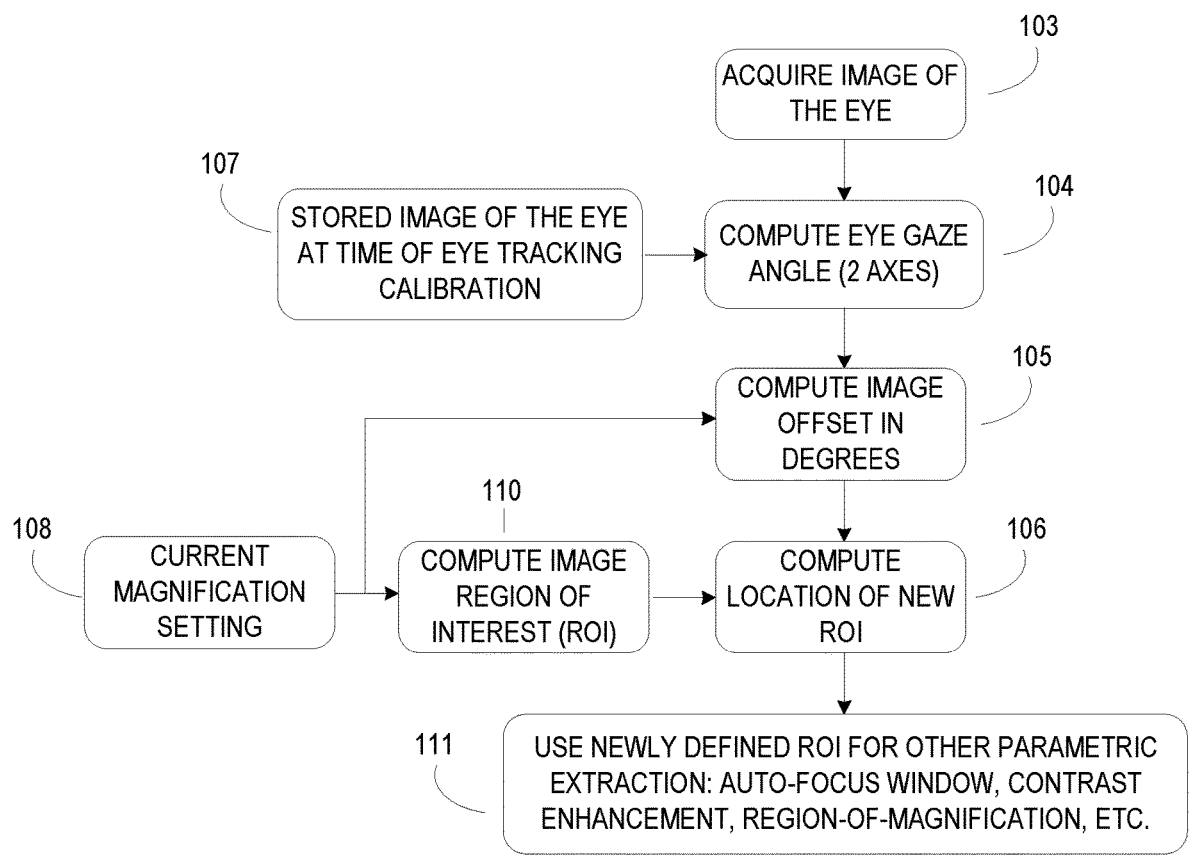
FIG. 13 is a flow chart for eye gaze angle region of interest image processing in accordance with one embodiment of the present invention.

FIG. 13 is a process diagram illustrating the use of the eye image to compute a location of a region of interest (ROI) for applying separate processing techniques to an image presented to the eye. An image of the eye is acquired (103) and the eye and is computed (104) using the stored image of the eye at time of eye tracking calibration (107). The image is computed in degrees (105) and a region of interest (110) is computed from the current magnification setting (108) and a new region of interest is computed (106) which is used to set various parameters in the processed image, including the auto-focus window, contrast enhancement and region of magnification (111).

Figures 14A, 14B:
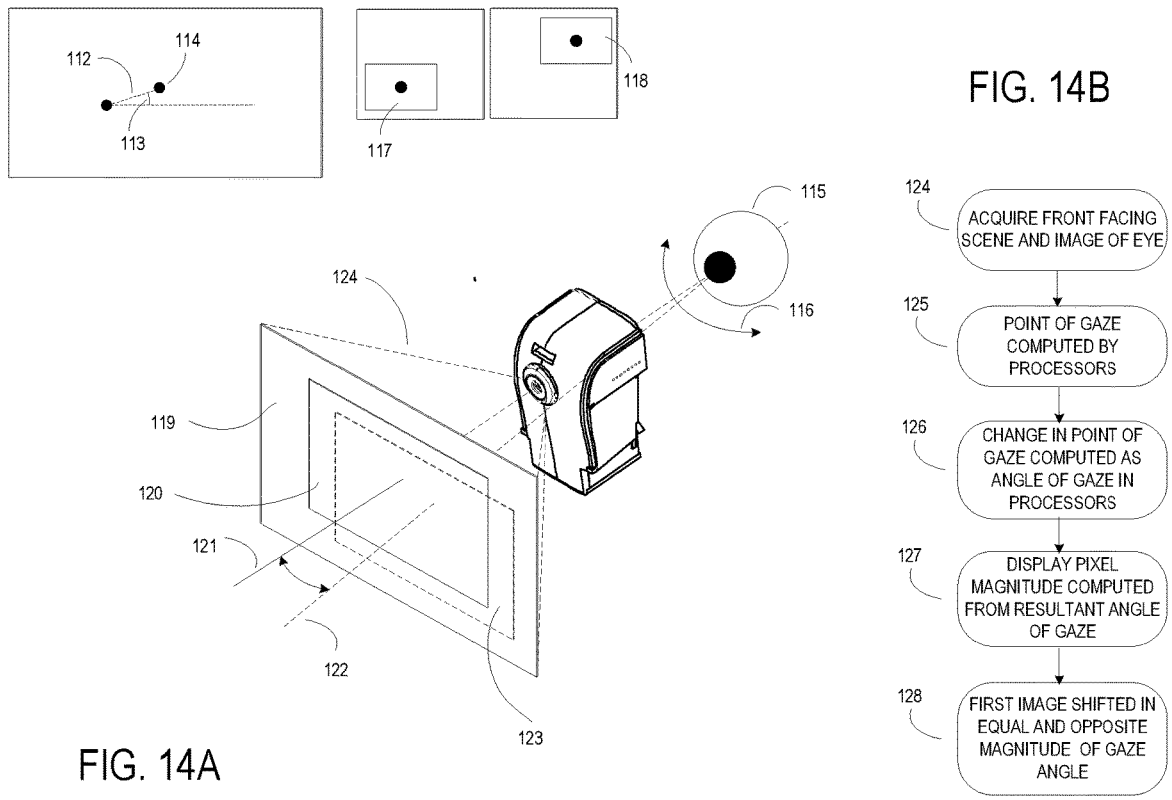
FIGS. 14A and 14B are a diagram and flow chart for eye gaze angle image offset determination in accordance with one embodiment of the present invention.

FIGS. 14A and 14B are a diagram and process diagram illustrating the use of a series of eye images (115), their computed gaze point (114), angle (113, 116) and magnitude (112) to determine acceleration and location of a centroid within a smaller region (120) of field of view captured by the front facing camera (119) to be shifted to a new region (123) within the larger image by a proportional movement from an initial point (121) to a final point (122). The first (124) and second (127) images are captured and the point of gaze is computed by processor or processors (125). The change in point of gaze (126) is computed and then the magnitude (112) of the change in point of gaze (127) are computed (117 and 118) from the resultant angle of gaze (113), and the processor or processors shift the image in equal and opposite magnitude (128). This feature is useful in that it compensates for the amplified perceived motion in the displayed image, as compared to the scene, when magnification is invoked. A simple example of this phenomenon follows. When looking through a telescope with 2× magnification, a 10 degree movement in the eye results in a 5 degree movement onto the unmagnified real scene. For a given optical field of view (such as 30 degrees in the HMDU), a 2× magnification results in a 15-degree real-scene field of view, or a 2× reduction in the total information content available on the microdisplay (albeit at a 2× magnification). Thus, the process described in this Figure of electronically scrolling the displayed image by an amount proportional to the user's eye movement (e.g., eye gaze angle) and to the magnification setting results in several benefits. The first benefit is that the 30 degree HMDU field of view is retained over the whole scene, irrespective of the magnification. Referring to the previous 2× magnification example, as the user's eye moves by 5 degrees, the HMDU electronically shifts the image such that the center of the user's gaze at 5 degrees matches the real-world, unmagnified scene also at 5 degrees. This results in the user's eye movements being more natural (which is even more important when reading) while still benefiting from magnification. The second benefit is that the microdisplay field of view now matches the scene field of view, irrespective of magnification. This results in less head movements when magnification is used, again making the experience closer to a natural (unmagnified) eye and head movements—while still benefiting from magnification. These angular corrections can be applied to both horizontal and vertical eye movements, and at all magnification settings.

Figures 15A, 15B:
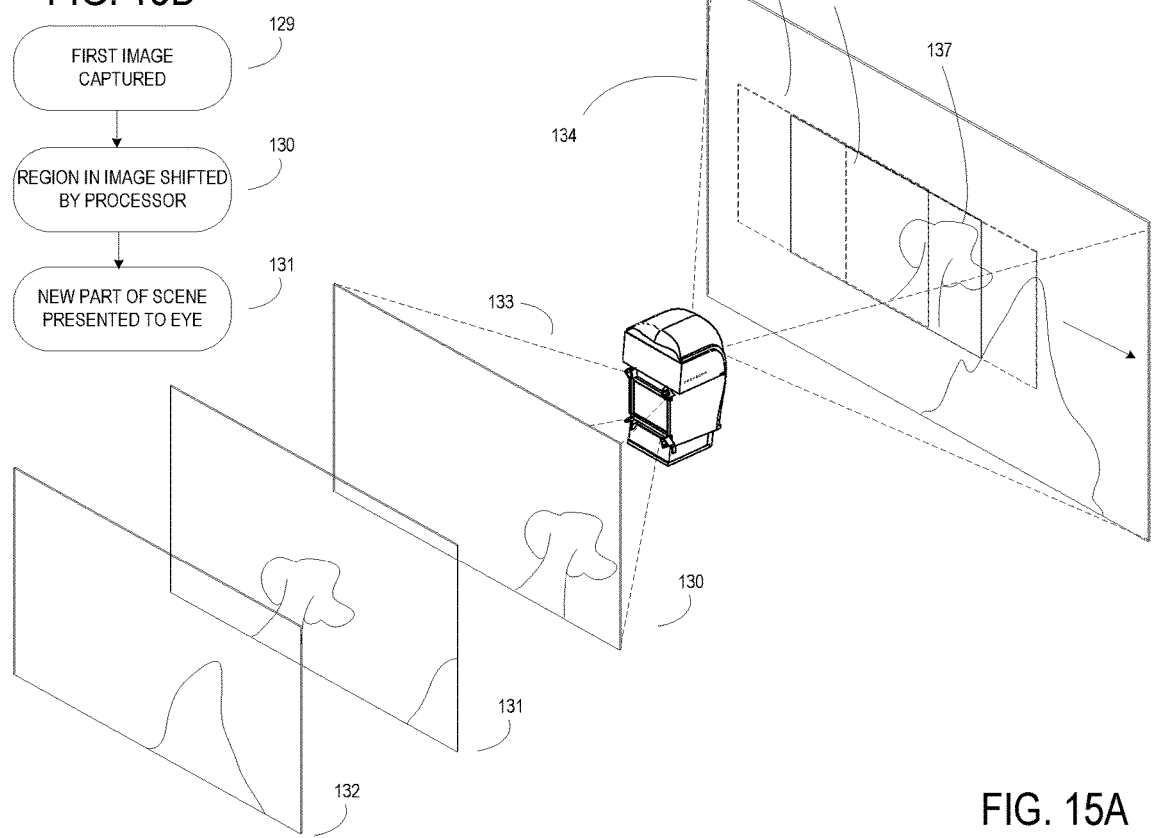
FIGS. 15A and 15B are a diagram and flow chart for image scrolling in accordance with one embodiment of the present invention.

FIGS. 15A and 15B are a diagram and process diagram describing the capturing of an image (129) from a front facing camera, shifting a region of the image at a constant or variable rate (135, 136, 137), and presenting these sequences of images to the eye (130, 131, 132) to maximize the perceived field of view of the scene presented to the eye (133). Persons afflicted with low vision, or tunnel vision (such as Retinis Pigmentosa, or RP) tend to scan the scene in front of them, in order to form a larger image from a smaller view of their restricted vision, allowing their brain to stitch together a more complete image of the scene. The HMDU can perform the same scanning function electronically, allowing the user to gaze forward and take-in the same smaller views of the scene, without the burden of mechanically (using the eye, or head, or a combination of the two) moving. This mode may be adjusted to each user's preference (rate of scan, when scanning is invoked, and other parameters).

FIGS. 16A and 16B are diagrams depicting a configuration in which two magnification settings are simultaneously applied and presented to the eye such that the image content (139) captured in a frame of the front facing camera (138) can be magnified to two different magnification settings (140, 141) and presented to the eye. This feature is useful in that it can provide the user with a larger instantaneous field of view across the whole microdisplay which benefiting from a greater magnification in the center of their gaze (that field of view would otherwise be smaller if the whole field of view is magnified to the greater amount as in the center region). The magnification can be performed optically using the first camera or electronically using the one or more processors.

FIGS. 17A and 17B are a diagram and flowchart and drawing depicting two or more colors applied to the foreground and background (147) of an image using one or more image processors. The front facing image is captured (142), and the background color of the image is determined by the processor or processors, and binary thresholding is applied to the image (143). A new color table (144) is applied to parts of the image (146) and the image is presented to the eye (145). Use of an image that has been converted and displayed as a binary image improves the contrast. This is useful for persons with low vision, particularly when reading. A further step of substituting certain colors onto that binary image (for example white to yellow, and black to blue) can further help in customizing the best sensory abilities of each user's particular preference or visual medical condition.

FIGS. 18A and 18B are diagrams and FIG. 18C is a flowchart depicting acceleration (151) data measured from one or more motion sensors (153), and front facing camera (152), and one or more processors shifting the image pixels (155) presented to the eye in equal and opposite magnitude and direction of the detected motion to mitigate motion blur and shake (150). The displayed field of view without this compensation (149) demonstrates the resulting large movement of the object (148). This feature is useful to help stabilize the magnified image. Since the HMDU is worn on the user's head (either mounted directly or through eyeglass frames), the front camera is subject to the user's slight head movements. When the image is magnified, slight motion of the head can lead to a complete loss of the viewed context (this is equivalent to looking through binocular with shaking arms). The HMDU detects, measures and compensates for that head movement by electronically scrolling the microdisplay image to counter the effects of the head movements. This compensation also uses the magnification setting as an input.

FIGS. 19A and 19B are diagrams and FIG. 19C is a flowchart depicting the method of determining the size of text in pixels (158) at a measured at a current focal distance (162), and modifying the magnification (159, 161) setting to keep text size constant over a range of focal distances and text sizes (160). The image is captured from the front facing camera (156) and the focal length (162) to an object being viewed (163) is determined in one or more processors (157). This feature is useful for users who prefer to read while their hands or arms might move back and forth, causing the size of the reading material (in both the scene and the microdisplay) to change. In this mode of operation, the HMDU electronically continuously adjusts the magnification up and down as needed to maintain a constant displayed font size for the user's comfortable reading experience.

FIGS. 20A and 20B are diagrams and a flowchart depicting the process of a smartphone or tablet requesting an image from either front facing or eye imaging cameras from the HMDU and the data being transferred and displayed on the tablet computer (164) through a wireless link (165) from a wireless transceiver in the HMDU (166). The HMDU is initially disconnected (167) until receiving a message from a wireless tablet computer to enter into a configuration mode (168), and this message is authenticated by the HMDU (169). The settings within the HMDU are transferred in a wireless manner to the tablet computer (170). At this point the tablet can disconnect from the HMDU at any time (175), or either request an image from the device (171) or change settings (174). If an image is requested to be sent, it is transmitted (172) to the tablet for display or further processing (173). This feature is useful in order to allow a doctor, or the user, or an assistant, to make certain adjustments to the non-volatile memory of the HDMU which personalize that particular HMDU unit. This also allows the changing and updating of these features as the user's preferences or needs change. This feature is also useful for transferring information from the HMDH to the tablet, including usage statistics, medical condition diagnoses or indications, images of the user's eye (for calibration, if necessary, of the eye tracking alignment or other diagnostic uses), or other operating information of the HMDU, such as temperature, voltages, and other sensor readings.

For example, one or more eye movements can be measured based on the second image or the modified second image, and an indication of a potential medical problem can be detected by analyzing the one or more eye movements. Thereafter, the user can be notified of the indication of the potential medical problem or the indication of the potential medical problem can be transmitted to a remote device, or the indication of the potential medical problem can be stored, etc. Statistics can also be performed and stored based on the measured eye movements.

This feature can also be integrated with a wireless connectivity (such as high speed cellular data, WiFi, or other generally available wireless networking facilities) to allow for a remote person or computer to assist the user by remotely seeing the user's scene. That remove viewing can result in mere recording of the scene video (including the displayed video or the ET camera video), or a real-time interaction whereby the user may be assisted in navigating through the current scene. For example, a user in a foreign country can use this feature to wirelessly connect to a local person who can read signs for them.

FIG. 21 describes the link between the HMDU and the battery pack. The user control inputs (183) are encoded in a data packet, and grouped with battery status (184) and other user-specific data (185) in the battery pack, then modulated (186) and transmitted over the power lead (188) into the HMDU (192) through a demodulator (190) and implemented with other data in the HMDU (191). The return lead (189) is connected to a battery pack feeding the HMDU power (187) and forming a complete circuit with the battery pack and HMDU. This feature is useful to reduce the number of electrical conductors needed to connect the HMDU with the battery pack. This feature is further useful if the eyeglasses frames are used as the two (and only two) conductors, thus eliminating explicit electrical wiring from the HMDU to the battery pack, on the front portion of the glasses. One embodiment of this approach is to attach the HMDU to frames configured to act as two conductors (one for electrical power and the other one for electrical return). The HMDU directly attached to the frame for both electrical and mechanical purposes. The backside of the eyeglass frames would then (through new electrical wires that only emanate from the back of the eyeglass frame stems) to the battery pack.

Additional features, functionality and elements that can be incorporated into the various embodiments of the present invention will not be described.

The placement of the camera and display in a substantially coaxial manner on the same line as the eye's line-of-sight. The alignment can be performed electrically, optically, mechanically or a combination thereof.

The combination of magnification with other image enhancement techniques simultaneously, such as contrast enhancement, edge sharpening, and others.

The combination of the above mentioned image enhancement techniques with artificially generated graphical objects, including artificial edge highlighting, creating a virtual realtime aided vision system.

The ability for the camera to perform automatic focus adjustment for a large range of scene/gaze distances, while allowing the eye to remain at a single fixed focus distance (set by the corrective glasses and the optical design of the electronic display system).

The implementation of digital image stabilization in order to counteracts the effects of head shaking. This is particularly useful when high magnification is used, whereby smallest head movements translate to a large perceived image shift, rendering the scene difficult to observe. The amount and dynamic parameters of the stabilization are a function of the current magnification setting. The motion data can be collected by one or more sensors.

The implementation of eye tracking, whereby the location and movements of the aided eye are measured and used for various compensatory schemes. One scheme is to shift the image vertically and/or horizontally in order to cause the perceived image shift to be equal to the actual scene shift for the given angle of the eye's movement, irrespective of the amount of magnification currently in effect. Another scheme is to use eye movements, for example when looking up, as a means of modifying the magnification setting automatically.

The use of a monocular aided system (the device) for a limited central field-of-view, with a visual interface to the peripheral view of the same eye. This forms a seamless visual field of an aided central vision with a natural (un-aided) peripheral vision.

The use of the above monocular system in conjunction with the un-aided eye, further causing a seamless binocular view of the scene.

The above but where the image in the aided portion of the aided eye is substantially modified (e.g., magnification of greater than 1.5, for example) such that the brain selects which of the images (aided eye with artificial magnification or un-aided eye with unity/natural magnification) to use, depending upon the current task-at-hand. This is referred to as monovision, but with an electronic and adjustable system of vision enhancements.

The ability of the device to behave differently based on upon the task-at-hand. This multimode operation (e.g., walking vs. close-in reading, vs. looking at a person's face) can be manually selected by the user (for example, using a push-button, gesture recognition, speech recognition). Alternatively, the operating mode of the device can be automatically set through means such as software analysis of the image in the current scene, detection of movements through an accelerometer (to detect walking or ambulation), etc.

A method of eye tracking (of imaging the aided eye) in-line with the display through the same prism, or coaxially with the display, sharing same optical path as the display.

The use of the display as the illumination source and a source of alignment targets (e.g., fiducials) onto the eye for use by the eye tracking system. This source of illumination or targets can be modulated in time in fast bursts such that they are not perceived by the user, while synchronizing the eye tracking camera with that source of light.

The use of the eye tracking camera to make measurements of eye movements, and to analyze these movements in to infer or diagnose the possibility of certain medical problems, such as the onset of an epileptic seizure, or for similar medical research or diagnostic purposes.

The use of embedded wireless connectivity (such as with Bluetooth to a Smart Phone) for notification of diagnoses or results from the eye tracking sub-system.

The applicability of eye tracking, image stabilization, and monocular aided vision to the specific problem of helping persons with AMD to better see, for a near-eye display system and coaxially-mounted camera.

The ability to electronically scan (shift left/right, up/down) automatically or under user control, allowing persons with tunnel vision (e.g., due to Glaucoma or Retinitis Pigmentosa) to see a large field of view over time than their natural eye allows, without having to move their eyes or head (or as much). This is possible due to a larger field of view of the camera as compared to the display and/or of the damaged eye's remaining central vision.

The implementation of vision tests that are normally administered using external visual targets, such the Amsler chart or the "eye chart" (to establish the visual acuity) by using the internal electronic display and electronically generated images, rather than images of wallmounted charts.

The ability to generate electronically pre-programmed sequences of images (from memory, and/or from a wirelessly connected device, such as a Smart Phone) to help exercise the eye (e.g., as used for baseball batters to improve eye speed response).

The mounting of the battery pack and user controls on the neck, rather than on the head or other places on the body, allowing for easy access to controls while also managing the weight of the batteries in a single convenient location.

The ability for the device to be configured by the doctor and by the patient for preferences, such as default and minimum/maximum values for magnification, contrast enhancement, artificial edge enhancements, and other image enhancing algorithm settings. These settings are stored in non-volatile memory within the head-mounted system, but are accessed wirelessly (e.g., Bluetooth), through a software application executing on a Smart Phone.

The ability to acquire, examine, and to select/deselect eye tracking calibration images. The head-mounted display, after being commanded by the Smart Phone (wirelessly) takes an image of the eye and transmits it to be viewed by the doctor. The doctor decides if the image is acceptable, and if the patient was indeed gazing at the proper angle, and commands the storage of that image as the reference eye tracking image from which all other eye tracking angular computations are subsequently made. Note that the eye need not be gazing forward, as the doctor can accept the angle and enter it as an offset to the subsequent computations of eye tracking.

The ability to customize (and to store in non-volatile memory) user preferences, including eye gesture recognition commands (such as magnification change and amount of magnification based on the eye sweeping upwards, the rate of sweep, etc.)

The ability for the head-mounted display system to act as a wireless display monitor for displaying the screen that would be shown on an external device, such as a Smart Phone.

Rather than looking at the Smart Phone display (through the head-mounted system's camera, image processor and microdisplay), the data that is presented on the screen may be wirelessly transmitted to the head-mounted system for direct display (through the internal image processor) to the microdisplay, thus bypassing the camera.

Each of these operations/features/functions listed below may be implemented independently or as a combination with other features. In some cases, one feature enables other features to be implemented, which would not be able to be done without the enabling feature (for example: eye tracking enables field-of-view compensation by shifting the image based on magnification and current point-of-gaze).

Change magnification with eye tracking in vertical direction (like bifocals or progressive lenses which vary the setting based on the height of the gaze).

Auto-focus using image analysis, and/or using a secondary sensor (e.g., a laser range finder), and a combination of the two based on the range of interest (e.g., laser for short range, image analysis long range)

Auto-focus using a third camera set to a different focus range, or a complex lens that sets the focus in different parts of the image at separate unique focus distances (all for faster finding the focus location).

Gesture recognition or eye control or implement commands (enabled by eye tracking) (e.g., "click" with blinking eye, etc.).

Automatic control of operation by scene analysis and detection.

Reading (invokes color substitution for better contrast) vs. walking (invokes artificial edge enhancement).

Automatic turn-on of flashlight (visible or IR) for low light close-in reading based on light level and auto-focus distance determination (which can be via scene analysis or a secondary distance sensor).

Automatic magnification setting when reading to keep the displayed text at a particular size (based on the user's vision and preference) irrespective of the text size in the scene.

The device can go to sleep (low power mode) when user removes device from head (use of a proximity sensor, IR), and wake-up (normal power mode) in the opposite case. Similarly, the device can go to sleep (low power mode) when user goes to sleep (does not move head for a while), and wake-up (normal power mode) in the opposite case. The second image of the eye can be used to detect that the eye is closed for a specified period of time, or is open after being closed for the specified period of time.

Image stabilization (depending on magnification setting) using accelerometer (or image analysis).

Means of determining the point of gaze (second camera, optics, algorithms-electronically)

Means of determining the point of gaze using optical correlation techniques (www.grc.nasa.gov/WWW/OptInstr/Wernet_Web/SPOF.html)

No-initial calibration or alignment needed for eye tracking, using fixed properly fitted glasses and system as knowing where the "center of the world" is located.

The same optical path can be used for the eye-tracking camera as is used for the display (to save overall size).

The image display can be used as a source of illumination for the eye-tracking camera (occasionally flash a pre-determined image from the display to the eye, in synchronization with the eye-tracking camera who can use this to make an eye measurement, or have a border on the image always, etc.). One or more illumination devices may also be configured to face towards the eye.

The point of gaze can be used for scrolling image based on magnification (for effective live-scene FOV while maintaining magnification). Electronic image scrolling adjustments (if not all three items are mechanically in-line) can be based on magnification and/or point of gaze and/or auto-focus distance determination.

The point of gaze can also be used set the auto-focus zone of interest (very useful when reading a book which is tilted relative to the viewing angle, where the top of the page and the bottom of the page are at a significantly different distance to the eye, and only the eye is moving to read it all).

The point of gaze can be used to set the image quality parameters (color, black level, white level, gain, gamma). For example, region-of-interest increased contrast (center region of macular area on display, with progressive change from rest of "peripheral" un-enhanced image).

The point of gaze zone size can be variable as a function of current magnification setting.

Establish line-of-sight of camera, and display and mounting onto lenses all concentric. Do the above using mechanical alignment of all three elements.

Purposely add an offset to that line-of-sight to compensate for the individual user's preferred retina locus or eccentric viewing.

Electronically scan in a pre-determined pattern (e.g., left-to-right, etc.) of the real scene onto the display to emulate a person's scanning using their eye or head movements (especially for people with tunnel vision).

No frame buffer, no DRAM, use of RGB pixels in display (minimal latency of image). Use of RGB pixels (vs. color progressive display) and other digital circuitry allows the no-use of a frame buffer. In other words, there is substantially no propagation delay (e.g., less than about one-tenth frame delay) between acquiring the first image and displaying the modified first image.

Combination of digital image processing and LCOS (Liquid Crystal-on-Silicon) or OLED (Organic LED) electronic display on the same die, saving space and power.

Orientation of overall mechanical design to be vertically longer to minimize sideways encroachment, to maximize sideways peripheral vision (also, raise it higher vs. lower to maximize bottom-side peripheral vision).

Data over power for reduced wires from battery pack to head-mounted unit.

Use of glasses frames as electrical conductors (e.g., power and ground on each half-frame) to make it wireless in the front and/or heat sinks.

Use of two separate monocular systems (each with its own camera, image processing and display) but coordinate the two for a binocular system by communicating system settings in real-time (e.g., focus setting, camera gain, magnification, etc.) to ensure that both eyes operate together, but yet each has his own complete and otherwise independent hardware.

Ability for the device described herein to further allow for coordination of both eyes (such as focus distance) but to perform other corrections (color, brightness, contrast, etc.) uniquely for each eye to maximize the overall perceived image quality for each individual user. The brightness may be adjusted based on a medical diagnosis, an eye sensitivity or a background illumination.

Ability to wirelessly transmit video (either or both scene image, eye tracking image, or combinations thereof) to an outside device for better testing, monitoring, etc.

Ability to wirelessly transmit video of the scene to allow a third party person to also see the scene to help the user understand the scene (e.g., a form of "facetime" where the camera is what's mounted on the user's glasses). Also, doctor might be able to look at the patient's eye remotely to help with diagnoses ("eyetime").

Combination of the device described herein specifically with a diseased eye (e.g., damaged retina, AMD, RP, etc.).

Combination of the device described herein with the use of an implanted lens (IMT or Cataract, or even LASIC) to complement the optical design of the display optics (making overall size smaller). Similarly, combination of the device described herein with the use of an implanted artificial retina to complement the overall functionality of the new artificial eye. The device is configured to complement, coordinate or communicate with the implant or artificial eye.

Perform visual acuity and other tests (e.g., Amsler chart) using display, record and report the results (wireless connectivity within the device)

Measure eye movements in normal operation, gather statistics, analyze and communicate to help in the diagnosis of various medical conditions, such as neurological problems (Traumatic Brain Injury, Parkinson's, epileptic seizures, etc.). Based this analysis, different display patterns can be implemented to help reduce eye strain or "relax" the person.

Use eye-tracking camera and optics to look into the retina for further diagnosis of evolving macular degeneration.

A single head- or glasses-mounted system that includes the placement of the camera and display (in a coaxial manner, or electronically corrected to be coaxial) on the same line as the eye's line-of-sight, the combination of magnification with other image enhancement techniques simultaneously, such as contrast enhancement, edge sharpening, artificial edge highlighting, and others, the combination of the above mentioned image enhancement techniques with artificially-generated graphical objects, including artificial edge highlighting, creating a virtual real-time aided vision system, and the ability for the camera to perform automatic focus adjustment for a large range of scene/gaze distances, while allowing the eye to remain at a single fixed focus distance (set by the corrective glasses and the optical design of the electronic display system).

The implementation of digital image stabilization in order to counteracts the effects of head shaking. This is particularly useful when high magnification is used, whereby smallest head movements translate to a large perceived image shift, rendering the scene difficult to observe. The amount and dynamic parameters of the stabilization are a function of the current magnification setting.

The implementation of eye tracking, whereby the location and movements of the aided eye are measured and used for various compensatory schemes, such as to shift the image vertically and/or horizontally in order to cause the perceived image shift to be equal to the actual scene shift for the given angle of the eye's movement, irrespective of the amount of magnification currently in effect, or to use eye movements, for example when looking up, as a means of modifying the magnification setting automatically.

The use of a monocular aided system for a limited central field-of-view, with a visual interface to the peripheral view of the same eye. This forms a seamless visual field of an aided central vision with a natural (un-aided) peripheral vision.

The use of the above monocular system in conjunction with the un-aided eye, further causing a seamless binocular view of the scene.

The image in the aided portion of the aided eye is substantially modified (e.g., magnification of greater than 1.5, for example) such that the brain selects which of the images (aided eye with artificial magnification or un-aided eye with unity/natural magnification) to use, depending upon the current task-at-hand. This is referred to as monovision, but with an electronic and adjustable system of vision enhancements.

The ability to behave differently based on upon the task-at-hand. This multi-mode operation (e.g., walking vs. close-in reading, vs. looking at a person's face) can be manually selected by the user (for example, using a pushbutton, gesture recognition, speech recognition). Alternatively, the operating mode can be automatically set through means such as software analysis of the image in the current scene, detection of movements through an accelerometer (to detect walking or ambulation), etc.

A method of eye tracking (of imaging the aided eye) in-line with the display through the same prism, or coaxially with the display, sharing same optical path as the display.

The use of the display as the illumination source and a source of alignment targets (e.g., fiducials) onto the eye for use by the eye tracking system. This source of illumination or targets can be modulated in time in fast bursts such that they are not perceived by the user, while synchronizing the eye tracking camera with that source of light.

The use of the eye tracking camera to make measurements of eye movements, and to analyze these movements in to infer or diagnose the possibility of certain medical problems, such as the onset of an epileptic seizure, or for similar medical research or diagnostic purposes.

The use of embedded wireless connectivity (such as with Bluetooth to a Smart Phone) for notification of diagnoses or results from the eye tracking sub-system.

The applicability of eye tracking, image stabilization, and monocular aided vision to the specific problem of helping persons with AMD to better see, for a near-eye display system and coaxially-mounted camera.

The ability to electronically scan (shift left/right, up/down) automatically or under user control, allowing persons with tunnel vision (e.g., due to Glaucoma or Retinitis Pigmentosa) to see a large field of view over time than their natural eye allows, without having to move their eyes or head (or as much). This is possible due to a larger field of view of the camera as compared to the display and/or of the damaged eye's remaining central vision.

The implementation of vision tests that are normally administered using external visual targets, such the Amsler chart or the "eye chart" (to establish the visual acuity) by using the internal electronic display and electronically generated images, rather than images of wall-mounted charts.

The ability to generate electronically pre-programmed sequences of images (from memory, and/or from a wirelessly connected device, such as a Smart Phone) to help exercise the eye (e.g., as used for baseball batters to improve eye speed response)—this could be monocular or binocular or bi-monocular (one eye at a time).

The mounting of the battery pack and user controls on the neck, rather than on the head or other places on the body, allowing for easy access to controls while also managing the weight of the batteries in a single convenient location.

The ability for the device to be configured by the doctor and by the patient for preferences, such as default and minimum/maximum values for magnification, contrast enhancement, artificial edge highlighting, and other image enhancing algorithm settings. These settings are stored in non-volatile memory within the head-mounted system, but are accessed wirelessly (e.g., Bluetooth, WiFi), through a software application executing on a wireless device accessing the Internet.

The ability to acquire, examine, and to select/deselect eye tracking calibration images. The head-mounted display, after being commanded by the Smart Phone (wirelessly) takes an image of the eye and transmits it to be viewed by the doctor. The doctor decides if the image is acceptable, and if the patient was indeed gazing at the proper angle, and commands the storage of that image as the reference eye tracking image from which all other eye tracking angular computations are subsequently made. Note that the eye need not be gazing forward, as the doctor can accept the angle and enter it as an offset to the subsequent computations of eye tracking.

The ability to customize (and to store in non-volatile memory) user preferences, including eye gesture recognition commands (such as magnification change and amount of magnification based on the eye sweeping upwards, the rate of sweep, etc.)

The ability for the head-mounted display system to act as a wireless display monitor for displaying the screen that would be shown on an external device, such as a Smart Phone. Rather than looking at the Smart Phone display (through the head-mounted system's camera, image processor and microdisplay), the data that is presented on the screen may be wirelessly transmitted to the head-mounted system for direct display (through the internal image processor) to the microdisplay, thus bypassing the camera.

The first camera may include an automatic focusing device. The second camera may a fixed focusing device or an automatic focusing device. The microdisplay may include an optical magnifier. The one or more processors and the microdisplay can be integrated into a single semiconductor die.

The microdisplay can be defined by a first zone and a second zone, wherein the first zone is a whole region of the microdisplay magnified by a background magnification amount, and the second zone is a contiguous zone within the first zone magnified by a different magnification amount. A center location of the second zone within the first zone can be computed from the gaze angle.

In addition, a time sequence of the first images or the modified first images or both the first images and the modified first images can be transmitted to an external device. Note that in some cases the images may also include the second image or the modified second image. The external device can store or view or process the time sequence of the first images or the modified first images or both the first images and the modified first images. The device can receive information from the external device based on the time sequence. Moreover, the device can receive a fourth image or a sequence of images or an information from the external device, create a fifth image by processing the received fourth image, or the sequence of images or the information using the one or more processors, and displaying the fifth image on the microdisplay.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

What is claimed is:

1. A computerized method comprising:
    providing a wearable apparatus proximate to a first eye of a person such that a second eye of the person is unobstructed, the wearable apparatus comprising a first camera configured to acquire a first image of a scene facing away from the first eye, a second camera configured to acquire a second image of the first eye, one or more sensors comprising a motion sensor and an ambient light sensor, a microdisplay configured to display a modified first image to the first eye, and one or more processors communicably coupled to the first camera, the second camera, the one or more sensors and the microdisplay, and wherein the wearable apparatus is sized to maintain a peripheral vision of the first eye;
    acquiring the first image of the scene using the first camera;
    acquiring the second image of the first eye using the second camera;
    determining an eye gaze angle based on the second image using the one or more processors;
    modifying the first image based on one or more vision improvement parameters and a data from the one or more sensors, and offsetting the first image by an image offset based the eye gaze angle using the one or more processors; and
    displaying the modified first image on the microdisplay.

2. The computerized method as recited in claim 1, wherein the one or more sensors further comprise a temperature sensor, a rangefinder, a proximity sensor or an infrared sensor.

3. The computerized method as recited in claim 1, further comprising occasionally flashing a predetermined image on the microdisplay.

4. The computerized method as recited in claim 1, wherein displaying the modified first image on the microdisplay further comprises scanning the modified first image onto the microdisplay in a predetermined pattern to emulate the person's eye or head movements.

5. The computerized method as recited in claim 1, wherein modifying the first image based on the one or more vision improvement parameters comprises:
    offsetting the first image based on a preferred retina locus or an eccentric viewing of the person;
    enhancing a contrast of the first image; or
    adjusting a brightness of the first image based on a medical diagnosis, an eye sensitivity, or a background illumination.

6. The computerized method as recited in claim 1, further comprising magnifying the first image of the scene based on a current magnification selected from two or more magnification settings using the first camera or the one or more processors, wherein the current magnification magnifies a whole field of view or only a region centered on a point of gaze.

7. The computerized method as recited in claim 1, further comprising automatically focusing the first image using:
    an image analysis based on the eye gaze angle, the one or more sensors or a combination thereof, wherein the one or more sensors further comprise a range finder;
    a third camera configured to acquire a third image of the scene facing away from the first eye that is set to a different focus range than the first camera; or
    a complex lens optically connected to the third camera that sets a focus in different parts of the third image at separate unique focus distance.

8. The computerized method as recited in claim 1, wherein the image offset is further based on an image stabilization comprising:
    measuring a motion data comprising an acceleration data using the one or more sensors, wherein the one or more sensors comprise a motion measurement sensor;
    determining an estimated motion data by comparing the first image of the scene to one or more previous first images of the scene; and
    determining the image stabilization by merging the acceleration data with the estimated motion data.

9. The computerized method as recited in claim 1, wherein modifying the first image based on the one or more vision improvement parameters comprises enhancing the first image of the scene using one or more image processing algorithms selected from at least one of a contrast enhancement algorithm, an edge sharpening algorithm, a virtual real-time aided vision algorithm, an automatic scene detection and mode setting algorithm, a magnification or image offset algorithm, an artificial edge highlighting/substitution algorithm or a gaze determination algorithm.

10. The computerized method as recited in claim 9, wherein the automatic scene detection and mode setting algorithm comprises:
    determining a scene type and a current task by analyzing the first image, the data from the one or more sensors, or a combination thereof;
    changing the one or more vision improvement parameters to match the scene type and the current task or one or more stored settings or preferences, or a combination thereof; and
    wherein the current task comprises a close-in reading, a far distance reading, gazing at an external electronic display, looking at another person, walking or driving.

11. The computerized method as recited in claim 1, wherein modifying the first image based on the one or more vision improvement parameters further comprises enhancing the first image of the scene using an eye gesture recognition and mode setting algorithm comprising:
    determining an eye gaze rate of change;
    determining a direction of an eye gaze motion;
    determining an eye gesture command based on the eye gaze angle, the eye gaze rate of change and the direction of the eye gaze motion; and
    changing the one or more vision improvement parameters or magnification in response to the eye gesture command based on one or more stored settings or preferences.

12. The computerized method as recited in claim 1, further comprising activating or deactivating a visible or infrared illuminator based on a light level or a distance determination, wherein the visible or infrared illuminator is configured to face towards the scene and is communicably coupled to the one or more processors.

13. The computerized method as recited in claim 1, wherein modifying the first image based on the one or more vision improvement parameters further comprises maintaining a size of a text within the modified first image at a specified size irrespective of an actual size of the text within the first image.

14. The computerized method as recited in claim 1, further comprising:
   entering a low power mode whenever the one or more sensors detects the person removing the wearable apparatus or going to sleep or the second image indicates that the second eye is closed for a specified period of time; and
   entering a normal power mode whenever the one or more sensors detects the person putting the wearable apparatus on or awakening from sleep, the second image indicates that the second eye is open after being closed for the specified period of time.

15. The computerized method as recited in claim 1, further comprising configuring one or more stored settings or preferences by:
   receiving a first message to enter a device setting/calibration mode from a remote device;
   transmitting the first image or the modified first image or both the first image and the modified first image to the remote device;
   receiving a second message containing a change to the one or more stored settings or preferences;
   implementing the change during one or more of the steps of acquiring the first image, modifying the first image and displaying the modified first image;
   transmitting the first image or the modified first image or both the first image and the modified first image to the remote device;
   storing the change to the one or more stored settings or preferences whenever a third message is received indicating that the first image or the modified first image or both the first image and the modified first image are acceptable;
   removing the change to the one or more stored settings or preferences whenever a fourth message is received indicating that the first image or the modified first image or both the first image and the modified first image are not acceptable; and
   receiving a fifth message to exit the device setting/calibration mode from the remote device.

16. The computerized method as recited in claim 1, further comprising configuring one or more stored settings or preferences by:
   receiving a first message to enter a device setting/calibration mode from a remote device;
   transmitting the first image or the modified first image or the second image or the or a combination thereof to the remote device;
   storing the second image as the stored image of the second eye whenever a sixth message is received indicating that the second image is acceptable;
   repeating the steps of acquiring and transmitting the first image or the modified first image or the second image or a combination thereof whenever a seventh message is received indicating that the second image is not acceptable; and
   receiving a fifth message to exit the device setting/calibration mode from the remote device.

17. The computerized method as recited in claim 1, further comprising:
   measuring one or more eye movements based on the second image;
   detecting an indication of a potential medical problem by analyzing the one or more eye movements; and
   notifying the user of the indication of the potential medical problem or transmitting the indication of the potential medical problem to a remote device, or storing the indication of the potential medical problem.

18. The computerized method as recited in claim 1, further comprising:
   performing an eye test by inserting an eye test chart into the modified first image;
   performing an eye exercise by inserting a pre-programmed sequence of images into the modified first image; or
   inserting a pre-programmed sequence of images into the modified first image to reduce a strain of the second eye or to relax the person.

19. The computerized method as recited in claim 1, wherein:
   the first image and the modified first image are not buffered; or
   there is substantially no propagation delay between acquiring the first image and displaying the modified first image.

20. The computerized method as recited in claim 1, further comprising transmitting a time sequence of the first images or the second images or the modified first images or any combination thereof to an external device.

21. The computerized method as recited in claim 1, further comprising:
   receiving a fourth image or a sequence of images or an information from an external device;
   creating a fifth image by processing the received fourth image, or the sequence of images or the information using the one or more processors; and
   displaying the fifth image on the microdisplay.

22. A wearable apparatus comprising:
   a first camera configured to acquire a first image of a scene facing away from a first eye of a person;
   a second camera configured to acquire a second image of the second eye;
   one or more sensors comprising a motion sensor and an ambient light detector;
   a microdisplay configured to display a modified first image to the eye such that a second eye of the person is unobstructed;
   one or more processors communicably coupled to the first camera, the second camera, the one or more sensors and the microdisplay, wherein the one or more processors are configured to acquire the first image of the scene using the first camera, acquire the second image of the eye using the second camera, determine an eye gaze angle based on the second image, modify the first image based on one or more vision improvement parameters and a data from the one or more sensors, offset the first image using an image offset based on the eye gaze angle, and display the modified first image on the microdisplay; and
   the wearable apparatus is sized to maintain a peripheral vision of the first eye.

23. The wearable apparatus as recited in claim 22, further comprising a visible or infrared illuminator communicably coupled to the one or more processors and configured to face towards the scene, wherein the visible or infrared illuminator is activated or deactivated based on a light level or a distance determination.

24. The wearable apparatus as recited in claim 22, wherein the wearable apparatus is attached to or integrated into a monocle, a pair of glasses, a pair of sunglasses or a frame to support the apparatus.

25. The wearable apparatus as recited in claim 24, wherein the frame for the pair of glasses or sunglasses provides a heat sink for the apparatus.

26. The wearable apparatus as recited in claim 24, further comprising a second apparatus attached to or integrated into the pair of glasses, the pair of sunglasses or the frame, wherein the wearable apparatus and the second apparatus communicate with one another.

27. The wearable apparatus as recited in claim 22, wherein:
the first camera and the microdisplay are substantially coaxially aligned with the eye electrically, optically, mechanically or a combination thereof; or
the one or more sensors further comprise a temperature sensor, a rangefinder, a proximity sensor or an infrared sensor.

28. The wearable apparatus as recited in claim 22, further comprising:
one or more controls communicably coupled to the one or more processors, wherein the one or more controls comprise a knob, a button, a capsense, a slider, a voice activated control, an eye motion activated control, a focus control, a gesture recognition control, an automatic sleep/wake-up control, or a combination thereof; or
an automatic focusing device communicably coupled to the first camera.

29. The wearable apparatus as recited in claim 22, wherein:
the wearable apparatus further comprises a control unit that is communicably coupled to the wearable apparatus wirelessly or via one or more conductors; and
the control unit comprises one or more status indicators, one or more controls, one or more batteries and a battery charger electrically connected to the one or more batteries, or a combination thereof.

30. The wearable apparatus as recited in claim 22, wherein the wearable apparatus is configured to complement, coordinate or communicate with an implant within the eye or the eye comprises an artificial eye.

31. The wearable apparatus as recited in claim 22, wherein:
the microdisplay is defined by a first zone and a second zone;
the first zone comprises a whole region of the microdisplay magnified by a background magnification amount; and
the second zone comprises a contiguous zone within the first zone magnified by a different magnification amount.

32. The wearable apparatus as recited in claim 22, further comprising an external device communicably coupled to the one or more processors, wherein the one or more processors are further configured to transmit a time sequence of the first images or the second images or the modified first images or any combination thereof to an external device.

33. The wearable apparatus as recited in claim 22, further comprising an external device communicably coupled to the one or more processors, wherein the one or more processors are further configured to:
receive a fourth image or a sequence of images or an information from the external device;
create a fifth image by processing the received fourth image, or the sequence of images or the information; and
displaying the fifth image on the microdisplay.

* * * * *